United States Patent
Lerman et al.

(10) Patent No.: US 10,733,718 B1
(45) Date of Patent: Aug. 4, 2020

(54) CORRUPTION DETECTION FOR DIGITAL THREE-DIMENSIONAL ENVIRONMENT RECONSTRUCTION

(71) Applicant: Regents of the University of Minnesota, Minneapolis, MN (US)

(72) Inventors: Gilad Lerman, St. Paul, MN (US); Yunpeng Shi, Saint Paul, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 16/366,800

(22) Filed: Mar. 27, 2019

Related U.S. Application Data

(60) Provisional application No. 62/648,558, filed on Mar. 27, 2018.

(51) Int. Cl.
| | |
|---|---|
| *G06T 7/00* | (2017.01) |
| *G06T 7/73* | (2017.01) |
| *H04N 5/247* | (2006.01) |
| *G05D 1/02* | (2020.01) |
| *G06T 7/55* | (2017.01) |

(52) U.S. Cl.
CPC .......... *G06T 7/0002* (2013.01); *G05D 1/0251* (2013.01); *G06T 7/55* (2017.01); *G06T 7/73* (2017.01); *H04N 5/247* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2004/0193413 A1* | 9/2004 | Wilson | G06T 7/20 704/243 |
| 2013/0070062 A1* | 3/2013 | Fouras | A61B 6/486 348/50 |
| 2016/0189339 A1 | 6/2016 | Kosoy et al. | |

FOREIGN PATENT DOCUMENTS

| | | |
|---|---|---|
| CN | 105844639 A | 8/2016 |
| CN | 107123164 A | 9/2017 |

OTHER PUBLICATIONS

Arie-Nachimson et al., "Global Motion Estimation from Point Matches," 2012 Second International Conference on 3D Imaging, Modeling, Processing, Visualization & Transmission, Oct. 2012, 8 pp.

(Continued)

*Primary Examiner* — Samira Monshi
(74) *Attorney, Agent, or Firm* — Shumaker & Sieffert, P.A.

(57) ABSTRACT

In general, a system is described that includes a set of one or more cameras and a computing device. The computing device receives a plurality of images of a three-dimensional environment captured by the one or more cameras, and a respective camera that captures a respective image is distinctly positioned at a respective particular location and in a respective particular direction. The computing device generates a plurality of image sets that each include at least three images. For each image set, the computing device calculates a plurality of predicted pairwise directions. The computing device compares a first sum of model pairwise directions with a second sum of the plurality of predicted pairwise directions and generates an inconsistency score for the respective image set. The computing device then reconstructs a digital representation of the three-dimensional environment depicted in the images.

20 Claims, 6 Drawing Sheets

(56) References Cited

OTHER PUBLICATIONS

Brand et al., "Spectral Solution of Large-Scale Extrinsic Camera Calibration as a Graph Embedding Problem," European Conference on Computer Vision 2004, May 2004, 14 pp.
Chatterjee et al., "Efficient and Robust Large-Scale Rotation Averaging," 2013 IEEE International Conference on Computer Vision, Dec. 2013, 8 pp.
Goldstein et al., "Shapefit and Shapekick for Robust, Scalable Structure from Motion," Computer Vision—ECCV 2016: 14th European Conference, Part 7, Aug. 2016, 16 pp.
Govindu, "Combining Two-View Constraints for Motion Estimation," Proceedings of the 2001 IEEE Computer Society Conference on Computer Vision and Pattern Recognition CVPR 2001, Dec. 2001, 8 pp.
Govindu, "Lie-Algebraic Averaging for Globally Consistent Motion Estimation," Proceedings of the 2004 IEEE Computer Society Conference on Vision and Pattern Recognition, May 2004, 8 pp.
Hand et al., "Shapefit: Exact location recovery from corrupted pairwise directions," Communications on Pure and Applied Mathematics, vol. 71, No. 1, Jul. 2015, 34 pp.
Hartley et al., "L1 Rotation Averaging Using the Weiszfeld Algorithm," CVPR 2011, Jun. 2011, 8 pp.
Hartley et al., "Multiple View Geometry in Computer Vision—Second Edition," Cambridge University Press, Mar. 2004, 673 pp.
Kennedy et al., "Identifying Maximal Rigid Components in Bearing-based Localization," 2012 IEEE/RSJ International Conference on Intelligent Robots and Systems, Oct. 2012, 8 pp.
Lerman et al., "Exact Camera Location Recovery by Least Unsquared Deviations," SIAM Journal on Imaging Sciences, vol. 11, No. 4, ArXiv:1709.09863, Sep. 2018, 24 pp.
Lowe, "Distinctive Image Features from Scale-Invariant Keypoints," International Journal of Computer Vision, vol. 60, No. 2, Nov. 2004, 28 pp.
Martinec et al., "Consistent Multi-view Reconstruction from Epipolar Geometries with Outliers," SCIA'03 Proceedings of the 13th Scandinavian Conference on Image Analysis, Jun. 2003, 8 pp.
Martinec et al., "Robust Rotation and Translation Estimation in Multiview Reconstruction," 2007 IEEE Conference on Computer Vision and Pattern Recognition, Jun. 2007, 8 pp.
Mitzenmacher et al., "Probability and Computing—Randomization and Probabilistic Techniques in Algorithms and Data Analysis—Second Edition," Cambridge University Press, 2017, 490 pp. (Applicant points out, in accordance with MPEP 609.04(a), that the year of publication, 2017, is sufficiently earlier than the effective U.S. filing date, so that the particular month of publication is not in issue.).
Moulon et al., "Global Fusion of Relative Motions for Robust, Accurate and Scalable Structure from Motion," 2013 IEEE International Conference on Computer Vision (ICCV), Dec. 2013, 8 pp.
Olsson et al., "A polynomial-time bound for matching and registration with outliers," 2008 IEEE Conference on Computer Vision and Pattern Recognition, Jun. 2008, 8 pp.
Ozyesil et al., "A Survey of Structure from Motion," Acta Numerica, vol. 26, May 2017, 40 pp.
Ozyesil et al., "Robust Camera Location Estimation by Convex Programming," 2015 IEEE Conference on Computer Vision and Pattern Recognition (CVPR), Jun. 2015, 10 pp.
Ozyesil et al., "Stable Camera Motion Estimation Using Convex Programming," SIAM Journal on Imaging Sciences, vol. 8, No. 2, Jan. 2015, 40 pp.
Pachauri et al., "Solving the multi-way matching problem by permutation synchronization," Advances in Neural Information Processing Systems 26 (NIPS 2013), Dec. 2013, 9 pp.
Sengupta et al., "A New Rank Constraint on Multi-view Fundamental Matrices, and Its Application to Camera Location Recovery," 2017 IEEE Conference on Computer Vision and Pattern Recognition (CVPR), Jul. 2017, 9 pp.
Triggs et al., "Bundle Adjustment—A Modern Synthesis," ICCV '99, Proceedings of the International Workshop on Vision Algorithms: Theory and Practice, Sep. 1999, 75 pp.
Tron et al., "Distributed 3-D Localization of Camera Sensor Networks from 2-D Image Measurements," IEEE Transactions on Automatic Control, vol. 59, No. 12, Dec. 2014, 16 pp.
Tron et al., "Distributed Image-Based 3-D Localization of Camera Sensor Networks," Proceedings of the 48th IEEE Conference on Decision and Control (CDC) held jointly with 2009 28th Chinese Control Conference, Dec. 2009, 8 pp.
Wilson et al., "Robust Global Translations with 1DSfM," Computer Vision—ECCV 2014: 13th European Conference, Sep. 2014, 15 pp.
Zach et al., "Disambiguating Visual Relations Using Loop Constraints," 2010 IEEE Computer Society Conference on Computer Vision and Pattern Recognition, Jun. 2010, 9 pp.
Zhang et al., "A graph-based optimization algorithm for fragmented image reassembly," Graphical Models, vol. 76, No. 5, Sep. 2014, 12 pp.
Zhou et al., "Robust outlier removal using penalized linear regression in multiview geometry," Neurocomputing, vol. 267, Dec. 2017, 11 pp.

* cited by examiner

US 10,733,718 B1

CORRUPTION DETECTION FOR DIGITAL THREE-DIMENSIONAL ENVIRONMENT RECONSTRUCTION

This application claims the benefit of priority to U.S. Provisional Patent Application No. 62/648,558, filed Mar. 27, 2018, the entire content of which is incorporate by reference.

GOVERNMENT INTEREST

This invention was made with government support under DMS-14-18386 and DMS-18-21266 awarded by National Science Foundation. The government has certain rights in the invention.

TECHNICAL FIELD

The disclosure relates to digital environment reconstruction using one or more computing devices.

BACKGROUND

Camera location estimation is a very valuable process for automated robotic devices that autonomously move through an environment, as the robotic device must be aware of both its surroundings and its own location within the environment. Recent outlier-robust methods have been proposed for camera location estimation. One class of solvers uses outlier detection algorithms as a preprocessing step to improve their subsequent estimator. One such algorithm is the 1DSfM algorithm. The 1DSfM algorithm projects three-dimensional (3D) pairwise direction vectors onto one-dimensional (1D) vectors, and reformulates the cycle-consistency constraints as an ordering problem and solves it using a heuristic combinatorial method. Another class of methods directly solve robust convex optimization problems and include the least unsquared deviations (LUD) algorithm and the ShapeFit algorithm.

SUMMARY

In one example, a method is described comprising receiving, by at least one processor, a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generating, by the at least one processor and from the plurality of images, a plurality of image sets, wherein each image set in the plurality of image sets images includes at least three images from the plurality of images; for each image set in the plurality of image sets: calculating, by the at least one processor, a plurality of predicted pairwise directions, wherein each predicted pairwise direction is based on image details of two different images included in the respective image set; comparing, by the at least one processor, a first sum of model pairwise directions with a second sum of the plurality of predicted pairwise directions; and generating, by the at least one processor and based on the comparison of the first sum and the second sum, an inconsistency score for the respective image set; and reconstructing, by the at least one processor, based on the plurality of image sets and on the respective inconsistency score of each image set, a digital representation of the three-dimensional environment depicted in the plurality of images.

In another example, a device is described, the device comprising at least one processor; and a storage device configured to store one or more modules operable by the at least one processor to: receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generate, from the plurality of images, a plurality of image sets, wherein each image set in the plurality of image sets images includes at least three images from the plurality of images; for each image set in the plurality of image sets: calculate a plurality of predicted pairwise directions, wherein each predicted pairwise direction is based on image details of two different images included in the respective image set; compare a first sum of model pairwise directions with a second sum of the plurality of predicted pairwise directions; and generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

In another example, an apparatus comprising means for receiving a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; means for generating, from the plurality of images, a plurality of image sets, wherein each image set in the plurality of image sets images includes at least three images from the plurality of images; for each image set in the plurality of image sets: means for calculating a plurality of predicted pairwise directions, wherein each predicted pairwise direction is based on image details of two different images included in the respective image set; means for comparing a first sum of model pairwise directions with a second sum of the plurality of predicted pairwise directions; and means for generating, based on the comparison of the first sum and the second sum, an inconsistency score for the respective image set; and means for reconstructing, based on the plurality of image sets and on the respective inconsistency score of each image set, a digital representation of the three-dimensional environment depicted in the plurality of images.

In another example, a non-transitory computer-readable storage medium storing instructions that, when executed, cause one or more processors of a field computing device to: receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generate, from the plurality of images, a plurality of image sets, wherein each image set in the plurality of image sets images includes at least three images from the plurality of images; for each image set in the plurality of image sets: calculate a plurality of predicted pairwise directions, wherein each predicted pairwise direction is based on image details of two different images included in the respective image set; compare a first sum of model pairwise directions with a second sum of the plurality of predicted pairwise directions; and generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
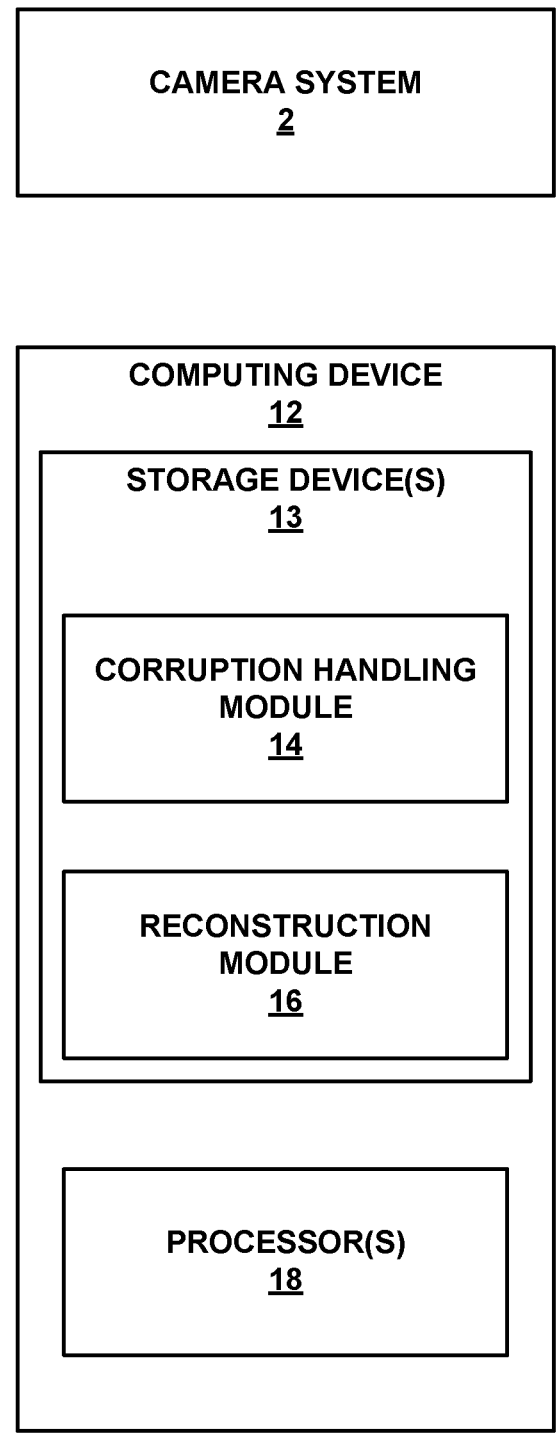
FIG. 1 is a block diagram illustrating a camera system and a computing device configured to perform the techniques described herein.

In general, this disclosure describes a system configured to perform techniques for reconstructing a digital representation of a three-dimensional (3D) environment. As part of this process, the system analyzes image sets captured by one or more cameras with particular locations and/or orientations to generate an inconsistency score based on predictions of these locations/orientations, weighting the images according to the inconsistency score. For instance, image sets with higher inconsistency scores may be weighted less, or filtered out completely, during the reconstructing process, instead favoring the image sets with lower inconsistency scores that are more reliable depictions of the three-dimensional environment.

The development of 3D reconstruction algorithms may, in various examples, control the vision systems of computing devices, such as robots. Namely, these algorithms may control how robots view 3D scenes with camera sensors. This disclosure includes robust algorithms for reconstructing 3D structures of an object and an environment from two-dimensional (2D) images. The 3D reconstruction pipeline aims to estimate the 3D real-world coordinates based on 2D image pixels from a plurality of images, where the plurality of images are captured by one or more cameras. In order to implement the 2D-to-3D transformation, the orientations and/or locations of cameras may be estimated. In various examples, this process may include the following steps: (a) estimate pixel-correspondence of pairs of images; (b) estimate camera orientations and relative camera locations from the estimated pixel-correspondence; (c) estimate absolute camera locations from relative camera locations, namely, pairwise directions; and (d) recover the structure of the object by estimating the 3D coordinates of the point cloud of object.

The techniques described herein include an autonomous data corruption filter that can be applied to the common 3D reconstruction pipelines. In particular, this filter automatically detects and removes the highly corrupted pairwise directions and can be used as a preprocessing step for any camera location solver. The algorithm for detecting corrupted camera pairwise directions may, in various examples, be summarized as follows.

For any three cameras with three predicted pairwise directions between them, an inconsistency score is computed. The inconsistency score of the three pairwise directions is defined such that the inconsistency is 0 if the three pairwise directions can form a cycle in a plane.

For any pairwise direction of interest, a number (e.g., fifty) of the three-camera triangles containing the given pairwise direction are randomly sampled and their corresponding inconsistency scores are computed. A weighted average of those inconsistency scores of the three-camera triangles is computed. This weighted average is called iteratively-reweighted weight statistic and is utilized to measure the corruption level of pairwise direction of interest. The weights are initialized equally, and then they are updated iteratively in a way such that the weight of a three-camera triangle is high if both the other two pairwise directions in that triangle have low iteratively re-weighted weight statistic. That is, the inconsistency measure of a three-camera triangle is trusted if its edges are also trusted. This reweighting strategy may, in many cases, significantly remove the uncertainty resulting from the corrupted data.

The iteratively re-weighted weight statistic is computed for all predicted pairwise directions, and the directions with high iteratively re-weighted weight statistics are removed so that the corruption of the original data can be cleaned. This data cleaning procedure may significantly improve the accuracy of camera location recovery and 3D reconstruction.

The techniques described herein do not necessarily focus on the heuristic optimization problem like 1DSfM, thus they do not suffer from convergence to local minima. Instead, the techniques described herein may use a theoretically guaranteed statistic to measure the corruption, which is easier to implement. By removing corrupted data in a reliable and interpretable way, the described techniques may significantly improve the camera location estimation accuracy (e.g., when combining with LUD or ShapeFit.) Further, convergence of the vectors to the global minimum is not guaranteed, and the 1DSfM algorithm tends to give low inconsistency scores even for severely-corrupted pairwise directions. For this reason, the 1DSfM algorithm may produce an inaccurate measure of corruptions. Both methods have limited ability of removing outliers.

FIG. 1 is a block diagram illustrating camera system 2 and computing device 12 configured to perform the techniques described herein. Camera system 2 may include one or more cameras, each of which may be an optical instrument for recording or capturing still images or videos. Each camera in camera system 2 may capture individual still photographs or sequences of images constituting videos or movies. Camera system 2 may be a physical component of computing device 12, or may be a separate component configured to send image data to computing device 12. Camera system 2 may perform various functions, such as capturing one or more images, focusing on one or more objects, and utilizing various flash settings, among other things, and forward the captured images to computing device 12.

In the example of FIG. 1, computing device 12 is a robotic device with autonomous motion. However, computing device 12 may be any type of mobile or non-mobile computing device that is configured to reconstruct a three-dimensional environment, such as a stationary robot, a manned robotic device, a mobile phone, a tablet computer, a personal digital assistant (PDA), a desktop computer, a laptop computer, a gaming system, a media player, an e-book reader, a television platform, an automobile navigation system, or a wearable computing device (e.g., a computerized watch, computerized eyewear, a computerized glove).

One or more processors 18 may implement functionality and/or execute instructions within computing device 12. For example, processors 18 on computing device 12 may receive and execute instructions stored by one or more storage devices 13 that execute the functionality of corruption handling module 14 and reconstruction module 16. These instructions executed by processors 18 may cause computing device 12 to process images received from camera system 2 to reconstruct a 3D environment during program execution. Processors 18 may execute instructions of modules 14 and 16 to cause computing device 12 to perform various actions or functions of computing device 12.

One or more storage devices 13 within computing device 12 may store information for processing during operation of computing device 12. Storage devices 13 may store data (e.g., images) that modules 14 and 16 access during execution at computing device 12. In some examples, storage device 13 is a temporary memory, meaning that a primary purpose of storage device 13 is not long-term storage. Storage devices 13 on computing device 12 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 13, in some examples, include one or more computer-readable storage media. Storage devices 13 may be configured to store larger amounts of information than volatile memory. Storage devices 13 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 13 may store program instructions and/or information (e.g., data) associated with modules 14 and 16.

Computing device 12 may include corruption handling module 14 and reconstruction module 16. Modules 14 and 16 may perform operations described using software, hardware, firmware, or a mixture of hardware, software, and firmware residing in and/or executing at computing device 12. Computing device 12 may execute modules 14 and 16 with one or more processors 18. Computing device 12 may execute modules 14 and 16 as a virtual machine executing on underlying hardware. Modules 14 and 16 may execute as a service or component of an operating system or computing platform. Modules 14 and 16 may execute as one or more executable programs at an application layer of a computing platform. Modules 14 and 16 may be otherwise arranged remotely to and remotely accessible to computing device 12, for instance, as one or more network services operating at a network in a network cloud.

In accordance with the techniques described herein, corruption handling module 14 of computing device 12 may receive a plurality of images of a three-dimensional environment from camera system 2. The plurality of images are captured by one or more cameras of camera system 2, and a respective camera of camera system 2 that captures a respective image of the plurality of images is distinctly positioned at a respective particular location and in a respective particular direction within the three-dimensional environment at a time when the respective image is captured. Corruption handling module 14 may generate, from the plurality of images, a plurality of image sets. Each image set in the plurality of image sets images includes at least three images from the plurality of images.

In some examples, for each image set in the plurality of image sets, corruption handling module 14 may calculate a plurality of model pairwise directions, where each model pairwise direction is based on determined absolute locations of two different images included in the respective image set. Conversely, rather than calculating model pairwise directions, a zero vector may be assumed as the theoretical sum of the model pairwise directions. Corruption handling module 14 may calculate a plurality of predicted pairwise directions, where each predicted pairwise direction is based on image details of two different images included in the respective image set. Corruption handling module 14 may compare a first sum of model pairwise directions (e.g., either the calculated sum or the assumed theoretical sum) with a second sum of the plurality of predicted pairwise directions and generate, based on the comparison of the first sum and the second sum, an inconsistency score for the respective image set. Reconstruction module 16 may reconstruct, based on the plurality of image sets and on the respective inconsistency score of each image set, a digital representation of the three-dimensional environment depicted in the plurality of images.

Figure 2:
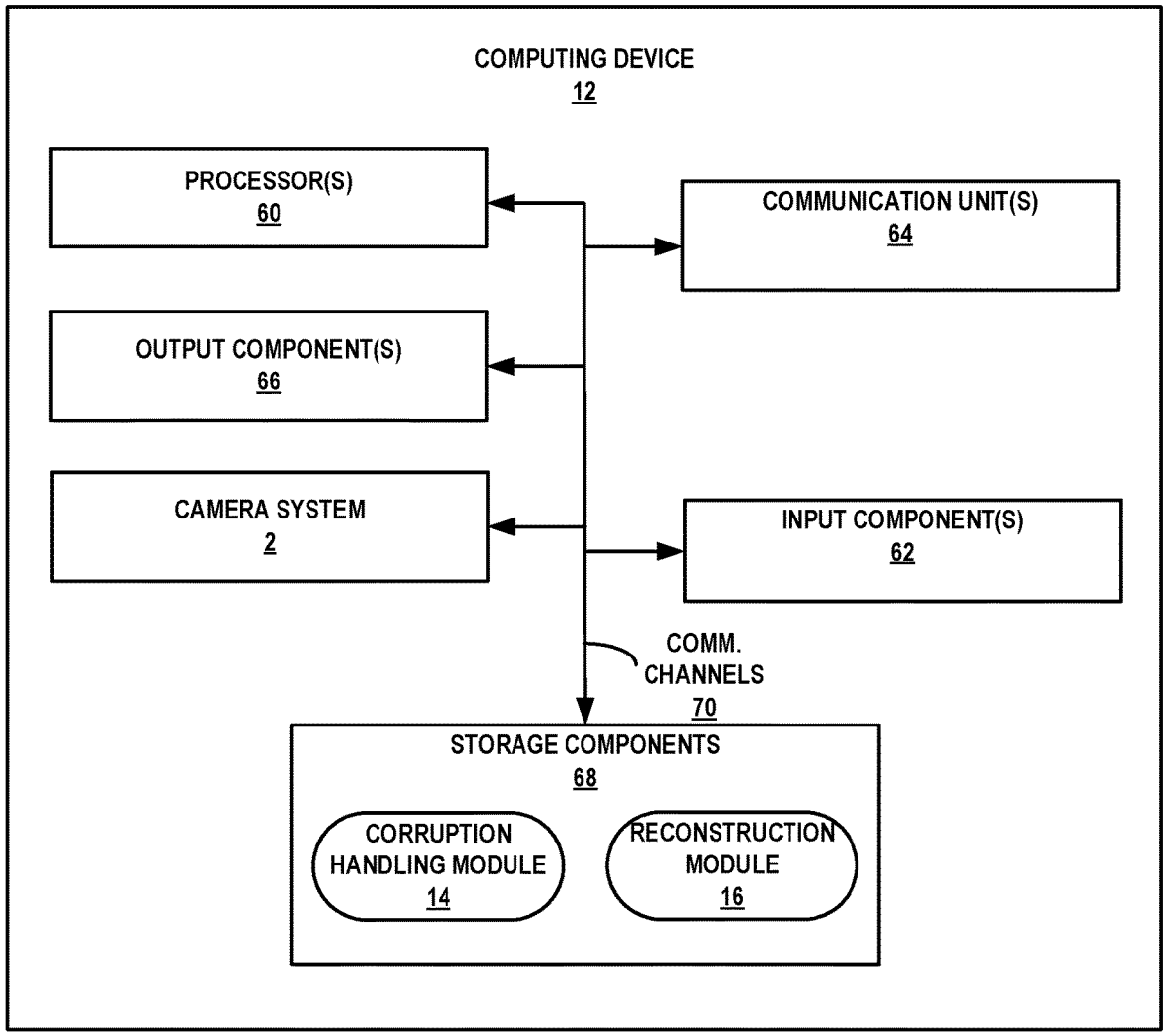
FIG. 2 is a block diagram illustrating a more detailed example of a computing device configured to perform the techniques described herein.

FIG. 2 is a block diagram of a more detailed view of computing device 12 that may be configured to perform one or more techniques in accordance with the current disclosure. Computing device 12 of FIG. 2 is described below as an example of computing device 12 of FIG. 1. FIG. 2 illustrates only one particular example of computing device 12, and many other examples of computing device 12 may be used in other instances and may include a subset of the components included in example computing device 12 or may include additional components not shown in FIG. 2.

As shown in the example of FIG. 2, computing device 12 includes camera system 2, one or more processors 60, one or more input components 62, one or more communication units 64, one or more output components 66, and one or more storage components 68. Storage components 68 of computing device 12 include demodulation module 16. Communication channels 50 may interconnect each of the components 2, 60, 64, 62, 66, and 68 for inter-component communications (physically, communicatively, and/or operatively). In some examples, communication channels 70 may include a system bus, a network connection, an interprocess communication data structure, or any other method for communicating data.

Camera system 2 may include one or more cameras, each of which may be an optical instrument for recording or capturing still images or videos. Each camera in camera system 2 may capture individual still photographs or sequences of images constituting videos or movies. Camera system 2 may be a physical component of computing device 12, as shown in FIG. 2. In other examples, camera system 2 may be a separate component configured to send image data to computing device 12. Camera system 2 may perform various functions, such as capturing one or more images, focusing on one or more objects, and utilizing various flash settings, among other things, and forward the captured images to computing device 12.

One or more communication units 64 of computing device 12 may communicate with external devices via one or more wired and/or wireless networks by transmitting and/or receiving network signals on the one or more networks. Examples of communication units 64 include a network interface card (e.g. such as an Ethernet card), an optical transceiver, a radio frequency transceiver, a GPS receiver, or any other type of device that can send and/or receive information. Other examples of communication units 64 may include short wave radios, cellular data radios, wireless network radios, as well as universal serial bus (USB) controllers. Communication units 64 may be configured to operate in accordance with a wireless protocol, such as WiFi®, Bluetooth®, or ZigBee®.

One or more input components 62 of computing device 12 may receive input. Examples of input are tactile, audio, and video input. Input components 62 of computing device 12, in one example, includes a presence-sensitive input device (e.g., a touch sensitive screen, a PSD), mouse, keyboard, voice responsive system, video camera, microphone or any other type of device for detecting input from a human or machine. In some examples, input components 62 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 66 of computing device 12 may generate output. Examples of output are tactile, audio, and video output. Output components 66 of computing device 12, in one example, includes a PSD, sound card, video graphics adapter card, speaker, cathode ray tube (CRT) monitor, liquid crystal display (LCD), or any other type of device for generating output to a human or machine.

One or more processors 60 may implement functionality and/or execute instructions associated with computing device 12. Examples of processors 60 include application processors, display controllers, auxiliary processors, one or more sensor hubs, and any other hardware configure to function as a processor, a processing unit, or a processing device. Module 16 may be operable by processors 60 to perform various actions, operations, or functions of computing device 12. For example, processors 60 of computing device 12 may retrieve and execute instructions stored by storage components 68 that cause processors 60 to perform the operations of module 16. The instructions, when executed by processors 60, may cause computing device 12 to store information within storage components 68.

One or more storage components 68 within computing device 12 may store information for processing during operation of computing device 12 (e.g., computing device 12 may store data accessed by modules 14 and 16 during execution at computing device 12). In some examples, storage component 68 is a temporary memory, meaning that a primary purpose of storage component 68 is not long-term storage. Storage components 68 on computing device 12 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 68, in some examples, also include one or more computer-readable storage media. Storage components 68 in some examples include one or more non-transitory computer-readable storage mediums. Storage components 68 may be configured to store larger amounts of information than typically stored by volatile memory. Storage components 68 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 68 may store program instructions and/or information (e.g., data) associated with modules 14 and 16. Storage components 68 may include a memory configured to store data or other information associated with modules 14 and 16.

In accordance with the techniques of this disclosure, corruption handling module 14 of computing device 12 may receive a plurality of images of a three-dimensional environment from camera system 2. In some examples, each image in the plurality of images is captured by a distinct camera. In some instances, these may be different cameras, or a same camera moving through the three-dimensional environment to distinct locations. In still other instances, the images in each image set are captured by a set of cameras with fixed locations in relation to other cameras in the set of cameras.

The plurality of images are captured by one or more cameras of camera system 2, and a respective camera of camera system 2 that captures a respective image of the plurality of images is distinctly positioned at a respective particular location and in a respective particular direction within the three-dimensional environment at a time when the respective image is captured. Corruption handling module 14 may generate, from the plurality of images, a plurality of image sets. Each image set in the plurality of image sets images includes at least three images from the plurality of images.

In some examples, for each image set in the plurality of image sets, corruption handling module 14 may calculate a plurality of model pairwise directions, where each model pairwise direction is based on absolute locations of two different images included in the respective image set. Theoretically, this sum would be a zero vector, and a zero vector may be assumed for this case if corruption handling module 14 does not explicitly calculate each model pairwise direction. In other examples, corruption handling module may calculate the absolute locations for each camera and calculate the model pairwise direction sum based on these absolute locations. For instance, in calculating the model pairwise directions, corruption handling module 14 may, for each image of the plurality of images, determine a relative rotation for the camera of the one or more cameras at a time the respective image was captured. Corruption handling module 14 may then determine, for a first image of the plurality of images, and based on the relative rotation for the first image, an absolute rotation for the camera of the one or more cameras that captured the first image and at the time the first image was captured. Corruption handling module 14 may further, for each image of the plurality of images, calculate, based on the absolute rotation for the first image, an absolute rotation for each remaining image of the plurality of images. Corruption handling module 14 may then calculate model pairwise directions based on the absolute rotation for each image in the respective image set.

In some such instances, in calculating the model pairwise directions, corruption handling module 14 may calculate, based on the absolute location of a first image of the respective image set and the absolute location of a second image of the respective image set, a first model pairwise direction of the model pairwise directions. Corruption handling module 14 may then calculate, based on the absolute location of the second image of the respective image set and the absolute location a third image of the respective image set, a second model pairwise direction of the model pairwise directions. Corruption handling module 14 may also calculate, based on the absolute location of the third image of the respective image set and the absolute location of the first image of the respective image set, a third model pairwise direction of the model pairwise directions. In these instances, the first sum is a sum of the first model pairwise direction, the second model pairwise direction, and the third model pairwise direction.

Corruption handling module 14 may calculate a plurality of predicted pairwise directions, where each predicted pairwise direction is based on image details of two different images included in the respective image set. In some examples, in calculating the plurality of predicted pairwise directions, corruption handling module 14 may calculate, based on image details of the first image of the respective image set and image details of the second image of the respective image set, a first predicted pairwise direction of the plurality of predicted pairwise directions. Corruption handling module 14 may also calculate, based on the image details of the second image of the respective image set and image details of the third image of the respective image set, a second predicted pairwise direction of the plurality of predicted pairwise directions. Corruption handling module 14 may then calculate, based on the image details of the third image of the respective image set and the image details of the first image of the respective image set, a third predicted pairwise direction of the plurality of predicted pairwise directions. In such examples, the second sum is a sum of the first predicted pairwise direction, the second predicted pairwise direction, and the third predicted pairwise direction.

In some instances, to calculate each predicted pairwise direction of the plurality of predicted pairwise directions, corruption handling module 14 may, for each pair of images in the respective image set, estimate a pixel-correspondence of the respective pair of images. Corruption handling module 14 may also estimate, for each image in the respective pair of images, and based on the pixel-correspondence, a camera orientation and a relative camera location. Corruption handling module 14 may further normalize the relative camera location and the camera orientation to obtain the predicted pairwise directions.

Corruption handling module 14 may compare a first sum of model pairwise directions with a second sum of the plurality of predicted pairwise directions and generate, based on the comparison of the first sum and the second sum, an inconsistency score for the respective image set. In some instances, each model pairwise direction in model pairwise directions and each predicted pairwise direction in the plurality of predicted pairwise directions are a respective normalized position vector, and the first sum may be a zero vector. Reconstruction module 16 may reconstruct, based on the plurality of image sets and on the respective inconsistency score of each image set, a digital representation of the three-dimensional environment depicted in the plurality of images.

In reconstructing the digital representation of the three-dimensional environment, reconstruction module 16 may, for each image set of the plurality of image sets, compare the inconsistency score for the respective image set to an inconsistency score threshold. Responsive to determining that the inconsistency score for the respective image set is less than the inconsistency score threshold, reconstruction module 16 may include the respective image set in a group of one or more non-corrupted image sets. Conversely, responsive to determining that the inconsistency score for the respective image set is greater than the inconsistency score threshold, reconstruction module 16 may exclude the respective image set from the group of one or more non-corrupted image sets. Then, for each image set included in the group of one or more non-corrupted image sets, reconstruction module 16 may assign, based on the respective inconsistency score, a weight to the respective image set and reconstruct the digital representation of the three-dimensional environment based on the group of one or more non-corrupted image sets and the respective weight for each of the image sets in the group of one or more non-corrupted image sets.

In some examples, in reconstructing the digital representation of the three-dimensional environment, reconstruction module 16 may, for each image set of the plurality of image sets, assign a weight to the respective image set based on the respective inconsistency score. The respective weight of each image set of the plurality of image sets is inversely proportional to the inconsistency score of the respective image set. After assigning the weight to each respective image set of the plurality of image sets, reconstruction module 16 may calculate a weighted average of the inconsistency scores of the plurality of image sets. Reconstruction module 16 may further iteratively reweight the respective weight for each of the image sets of the plurality of image sets to increase weights for the image sets with relatively low inconsistency scores in relation to other image sets of the plurality of image sets, as well as to decrease weights for the image sets with relatively high inconsistency scores in relation to the other image sets of the plurality of image sets. Reconstruction module 16 may then reconstruct the digital representation of the three-dimensional environment based on the plurality of image sets and the respective weight for each of the image sets in the plurality of image sets. In particular, in reconstructing the digital representation of the three-dimensional environment, reconstruction module 16 may utilize one of a least unsquared deviations algorithm, a ShapeFit algorithm, or a ShapeKick algorithm.

Computing device 12 may utilize this reconstructed digital representation of the three-dimensional environment for the purposes of navigation. For instance, computing device 12 may be a mobile robotic device, or may control a separate mobile robotic device. The three-dimensional environment may be an environment through which the mobile robotic device must move. As such, computing device 12 may navigate the mobile robotic device through the three-dimensional environment using the digital representation of the three-dimensional environment and the one or more cameras.

A strategy is for improving the existing methods for solving synchronization problems that arises from computer vision tasks. Specifically, the strategy identifies severely corrupted relative measurements based on loop consistency information. These techniques provide the first exact recovery using loop consistency. Under certain weak conditions, the algorithm linearly converges to the desired solution.

The problem of synchronization arises from various important tasks such as structure from motion (SfM), Cryo-EM, community detection, sensor network localization and etc. In particular, the group sychronization is one of the most common scenario, the group elements are recovered from their noisy group ratios. Specifically, the elements of group are denoted $\mathcal{G}$ by $g_i^*$ for $1 \le i \le n$ and let $G([n], E)$ be a graph of n vertices with the set of edge E. The noiseless group ratio between $g_i^*$ and $g_j^*$ is defined as $g_{ij}^* = g_i^* g_j^{*-1}$. The group ratio also belongs to $\mathcal{G}$ and the star superscript is used to emphasize that the corresponding group element is noiseless. Let $\tilde{g}_{ij}$ be the possibly noisy and corrupted measurement of $g_{ij}$ for $ij \in E$, the goal of group synchronization is to recover the true group elements $\{g_i^*\}_{i \in [n]}$ from possibly noisy and corrupted group ratios $\{\tilde{g}_{ij}\}_{ij \in E}$. Classical examples of such group $\mathcal{G}$ include $\mathbb{Z}_2$, SO(3) and $S_n$ which correspond to synchronization of signs, rotations and permutations respectively. The group ratio in those cases are relative signs, relative rotations and relative permutations respectively. In other words, the group sychronization utilizes possibly noisy and corrupted relative group elements to obtain the absolute group elements. Since $g_{ij}^*$ can also be written as $g_i^* g_0 (g_j^* g_0)^{-1}$ for any $g_0 \in \mathcal{G}$, any $\{g_i^* g_0\}_{i \in [n]}$ is also a solution.

Thus, only the original group elements $\{g_i^*\}_{i \in [n]}$ are recovered up to a right group action. For instance, $\mathbb{Z}_2$ synchronization solves signs ±1 (labels of classes in binary classification) from relative signs (indication of whether the two nodes are from the same class) up to a global sign. In particular, $\mathbb{Z}_2$ synchronization is closely related to community detection and the Max-cut problem and has successful applications in sensor network localication and cryo-EM 3D imaging algorithms. The permutation synchronization is motivated by image matching problem, where keypoint matches between two images can be viewed as a relative permutation between the two keypoint sets of the two images. It solves permutations (absolute keypoint labels) from relative permuations (keypoint-label-permutations/transformations) up to a global permutation. Thus, permutation synchronization has important applications in finding globally consistent images matches. The SO(3) sychronization problems estimate absolute rotations from relative rotations up to a rotation. Rotation sychronization is widely used in 3D imaging and computer vision tasks. In particular, applies rotation synchronization for solving absolute rotations of molecules; synchronizes the relative rotations of cameras to obtain the global camera rotations in structure from motion problem.

Another class of synchronization problem takes normalized relative group elements as input. It can be viewed as a special variant of group synchronization problem, and it is called normalized synchronization. Specifically, if $\mathcal{G}$ is a group with norm $\|\cdot\|_\mathcal{G}$, then in the noiseless case, the normalized synchronization solves the group elements using normalized relative group elements $g_i^* g_j^{*-1}/\|g_i^* g_j^{*-1}\|$ instead of group ratios $g_i^* g_j^{*-1}$. Similar to the group synchronization problem, the normalized synchronization may take noisy and corrupted normalized relative group elements as input. One important application of normalized synchronization is translation synchronization in structure from motion. In the noiseless case, the translation synchronization solves absolute camera locations $\{t_i^*\}_{i \in [n]}$ from pairwise directions $\{\gamma_{ij}^{*l}\}_{ij \in E}$, where $t_i^* \in \mathbb{R}^3$ and $\gamma_{ij}^* := (t_i^* - t_j^*)/\|t_i^* - t_j^*\|$. Since camera locations belong to an abelian group $\mathbb{R}^3$ with Euclidean norm and the pairwise directions are normalized differences of pairs of locations, the location synchronization is indeed a normalized synchronization problem. For group $\mathcal{G}$ such that $\|g\|_\mathcal{G} = c$ for all $g \in \mathcal{G}$, the group synchronization is equivalent to normalized synchronization. Examples include $\mathbb{Z}_2$ synchronization, SO(d) synchronization with spectral or Frobenius norm, and permutation synchronization with Frobenius norm.

For groups in discrete domain (e.g. $\mathbb{Z}_2$ and $S_n$), the sychronization problem are usually NP-hard. Thus, many classic methods of group synchronization instead solve a relaxed semidefinite programming (SDP) problem, which can be solved in polynomial time with any fixed precision. However, those relaxation techiques may change the original problem and thus unable to recover the ground truth group elements in the presence of severe corruption of group ratios.

Despite the success of SDP relaxation theory and applications, the formulations and the analysis techniques are distinct for different groups. One interesting problem is to find a more universal framework that allows to tackle different groups in the same way. It can be easily observed that cycle consistency $g_{i_1 i_2}^* g_{i_2 i_3}^* \ldots g_{i_{N-1} i_N}^* g_{i_N i_1}^* = e$ is one common property that is shared by any group $\mathcal{G}$. Thus, To avoid the issue of relaxation while maintaining effciency of the algorithm, an inference-based method that utilizes only 3-cycle consistency constraint $g_{ij}^* g_{jk}^* g_{ki}^* = e$ to identify the outliers in the group ratios is proposed, where e is the group identity. Specifically, the algorithm assigns to each $ij \in E$ an iteratively-reweighted inconsistency score (IRIS) that measures the corruption level of each $g_{ij}$. The group ratios with high scores will be removed and thus this preprocessing step may improve the performance of common solvers. While focus on camera location synchronization, the reweighting strategy is generalized to general group synchronization problems. In addition, the theoretical results of the method on the robustness to outliers and stability to noise are shown. Most importantly, in both theory and practice, the proposed method has the exact recovery property. That is, under low level of corruption on group ratios, the method is able to separate $E_g$ and $E_b$ exactly.

To obtain the 3D structure of an object, the system may use many different images, where each image is taken by a camera at certain location and certain orientation. The cameras' pose (location and orientation) may be initially unknown and the system may only estimate them from the images. Once the system determines the camera poses, the system may transfer the 2D pixels back to 3D points to obtain the structure. Thus, determining the camera poses is the most important task. The following steps may be used in making such determinations.

Step 1: Image Matching (e.g., with permutation synchronization).

For each pair of images, the system may extract some keypoints for both images. Keypoints are usually pixels that can be easily captured by human eyes, like pixels on the edge or corner of an object in the image. For image #1 and image #2, a perfect matching means that a keypoint in image #1 is matches to a keypoint in image #2 if and only if those two points corresponds to the same 3D point in the real scene (e.g, the keyhole on the door in image #1 is matched to the keyhole on the door in image #2). The image matching may be done automatically by algorithms based on pixel similarities and may not have perfect matches. For each pair of images, the system may select 8 or more keypoint pairs (e.g. 8 points on image #1 and 8 on image #2 and match those two sets of points.) This procedure is repeated for other pairs of images.

Step 2: Estimating Fundamental Matrices

The point matches between each two images encode the relative pose between the two cameras. This information can be better stored in a format which the system may use fundamental matrices (e.g., a 3 by 3 matrix that also encodes relative pose information). If the system looks at 1000 image pairs then the system may also have 1000 fundamental matrices, and each matrix encodes the relative camera pose between the corresponding image pairs.

Step 3: Obtaining Relative Camera Rotations

The system can decompose the fundamental matrices to obtain relative camera rotations directly. Assume that the system uses 50 images, and 1000 pairs of images have estimated fundamental matrices. Then after this step, the system may obtain 1000 camera relative rotations (also referred to as "camera relative orientations").

Step 4: Obtaining Absolute Camera Rotations from Relatives Rotations (50 absolute rotations for all cameras and 1000 relative ones for all pairs)

This step is also called rotation synchronization. Assume that one of the camera absolute rotation is fixed, from the 1000 relative rotations, the system can obtain the rest 49 camera absolute rotations. However, since step 1 may include some mismatches, the system may include some inaccurate fundamental matrices, which can lead to the system having some inaccurate relative rotations. Thus, to improve the performance, the estimation algorithm may be robust enough to eliminate the impact from outliers (e.g., the wrong relative rotations).

Step 5: Obtaining relative positions of cameras (the relative positions have no distance information, thus they are called relative directions, and more precisely, pairwise directions)

This can be done by combining the information from fundamental matrices (step 2) and absolute rotations (step 4).

Step 6: Obtaining absolute positions (locations) of cameras, from the relative positions (actually are called pairwise directions)

This is also called Location Synchronization, Translation Synchronization, or camera location estimation. Again, there exists wrong pairwise directions since Step 1 is not perfectly done. Thus, the system may identify and remove the bad pairwise directions to get a better estimate of camera locations. Up to this point the system may have solved camera poses (i.e. absolute camera rotations (step 4) and locations (step 6)). Thus, the pipeline is completed.

Roughly speaking, solving absolute values (not limited to values) from relative values between pairs. For example, rotation synchronization is to find the absolute rotations from the relative ones.

One typical example of cycle consistency is: the relative rotation (or location, or etc) between A and B (A, B . . . can be cameras, depending on applications) together with the relative rotation between B and C is equal to the relative rotation between A and C. This relation in general is true, as long as relative rotations are uncorrupted. On the other hand, if there is any corruption of relative rotations, then there is no cycle consistency. Thus, the system may measure the cycle inconsistency score to indicate corruption level. Most importantly, the system can use exploit this relation and extend this concept to rotation synchronization, Z2 synchronization and permuation synchronization, as long as the cycle consistency relation holds for uncorrupted rotation Z2 permutation and etc.

The system may find absolute binary labels from the relative binary labels. Thus, the Z2 synchronization has applications in comminity detection (separate the people/other object, into 2 or more groups based on their similarities/other pairwise relations). Z2 synchronization also have cycle consistency: if image 1 and 2 are in the same group, and image 2 and 3 are in the same group, then image 1 and 3 must also be in the same group.

Assume that the system may have a match between image A and image B. Each image has 4 keypoints. The keypoints in image A are labeled as A1, A2, A3, A4, and are belonging to Capitol's dome, window, door and wall respectively. The keypoints in image B are labeled as B1, B2, B3, B4, and are belonging to Capitol's window, dome, wall and door respectively. Then obviously the correct matching is A1-B2 (dome), A2-B1 (window), A3-B4 (door) and A4-B3 (wall). That is, 1234 in A corresponds to 2143 in B, thus matching can be represented (encoded) as a permutation between two sets of numbers. The goal of permuation synchronization is to find absolute permutations (keypoint labels in each image) from relative permutations (image matches) between pairs of images. Note that the system may still have cycle consistency here: if A1 is matched to B2, B2 is matched to C4 (the 4th keypoint in image C), then A1 must be matched to C4. The system can also use cycle consistency to remove the wrong permutations (image matches).

As described above, the estimation error originates from the very first step, and the error accumulates along the pipeline. The ealier the system addresses the wrong information, the better chance the system may have to obtain better performance. Thus, instead of addressing the corruption in the very last step 6, the system may also address them in an earlier stage like rotation synchronization (step 4) and permutation synchronization (image matching, step 1).

The SDP relaxation approach has been widely applied in. Suppose that each $g_i$ can be represented by a N by N orthonormal matrix. Namely, $g_i \in O(N)$. Instead of solving $X := (g_i)_{i \in [n]} \in \mathbb{R}^{nN \times N}$, SDP relaxation solves a block matrix $X := XX^T \in \mathbb{R}^{nN \times nN}$ where each block is a N×N matrix $g_i g_j^T$. Specifically, it solves the following relaxed formulation $$\underset{X \in \mathbb{R}^{nN \times nN}}{\text{maximize}} \ Tr(X^T Y) \quad (1)$$

$$\text{subject to } X_{ii} = I_{N \times N}, i = 1, \ldots, n$$

$$X \succ 0$$

where $Y_{ij} = g_{ij}$ if $ij \in E$ and $Y_{ij} = 0_{N \times N}$ otherwise. The nonconvex constraint rank(X)=N is usually relaxed first, then spectral approaches will be applied to find low rank solutions. One of the important problems on robust synchronization is the tolerance of the algorithm to the corruption of group ratios. That is, given partially corrupted elements of Y, whether or not (1) can recover exactly the ground truth group elements $X^* := (g_i^*)_{i \in [n]}$. The objective function of (1) is equivalent to minimizing $\Sigma_{ij \in E} \|g_i g_j^{-1} - g_{ij}\|_F^2$. Due to its least squares nature, the formulation (1) is sensitive to outliers and can only guarantee exact recovery in certain discrete domain (e.g. $\mathbb{Z}_2$, $S_n$).

The SDP relaxation of $\mathbb{Z}_2$ synchronization corresponds to (1) with N=1 and $Y_{ij}=\pm 1$. In this case, the exact recovery theories are established. All the results suggest that for i.i.d. corruption of group ratio with probability strictly less than a half, the SDP relaxation may recover the ground truth with high probability as n→∞. The SDP relaxation for permutation synchronization is equivalent to (1) where each permutation $\sigma_i$ is represented by a permutation matrix $P_i \in \mathbb{R}^{N \times N}$ and $Y_{ij} = P_{ij}$ is the noisy measurement of relative permutation matrix $P_i P_j^{-1}$. However, there is no known exact recovery theory for permutation synchronization. The robust rotation estimation problem has been extensively studied in. Most of the work combines $\ell_1$ minimization framework with either semidefinite relaxation or Lie-algebraic method. The method proposed in replaces the least squares formulation of (1) with $\ell_1$ minimization and solves the problem using IRLS (Iteratively Reweighted Least Squares). An exact recovery property for this robust aapproach is established. That is, under certain probabilistic corruption model, the exact recovery of the noiseless rotation matrices is guaranteed for sufficiently large n, when corrupted rotations follow the Haar distribution over SO(3) and the probability of corruption is less than a critical probability $P_c \approx 0.51$. A local and iterative method first transforms the rotations to Lie Algebra vertor space using exponential map and then apply the IRLS to solve a $\ell_1$ minimization problem. However, there is no rigorous arguments on the exact recovery of Lie-Algebraic approaches.

While the most direct way of solving robust synchronization problem is to estimate the absolute group elements using SDP relaxation and its robust variants, the focus is on another category of approach that uses cycle (loop) consistency as a statistical inference to achieve the robustness of solutions. The inference-based methods idenifes potential outliers in the group ratio measurements using the following cycle consistency constraint. Let $L = \{i_1, i_2, \ldots i_m\}$ be any path of length m, then $$g_L^* = g_{i_1 i_2}^* g_{i_2 i_3}^* \cdots g_{i_m i_1}^* = e. \tag{2}$$

That is, the multiplication of group ratios along a cycle gives identity. Unlike robust rotation estimation, the issue of robust location estimation is not properly addressed until recent years.

A group synchronization problem is defined as follows: Let G([n],E) be a graph where each ij∈E is initially assigned a $g_{ij}^* = g_i^* g_j^{*-1}$ and $g_i^*$'s are elements of group $\mathcal{G}$. Further, assume that $\mathcal{G}$ lies in a metric space with metric $d\mathcal{G}(\cdot,\cdot)$. The set of edges E is partitioned as $E_g \cup E_b$ where for each ij∈$E_b$, the initially assigned $g_{ij}^*$ is replaced by $\tilde{g}_{ij}$ that follows from distribution $\mathcal{F}$ supported on group $\mathcal{G}$. That is, $$g_{ij} = \begin{cases} g_{ij}^*, & ij \in E_g; \\ \tilde{g}_{ij}, & ij \in E_b. \end{cases} \tag{3}$$

By the definition of $g_{ij}^*$, for any loop $l_i = \{i_1 i_2, i_2 i_3, \ldots, i_{n_i} i_1\} \subseteq E_g$, $$\prod_{ij \in l_i \subseteq E_g} g_{ij}^* := g_{i_1 i_2}^* g_{i_2 i_3}^* \cdots g_{i_{n_i} i_1}^* = e. \tag{4}$$

However, this relation is generally not true when considering loops that contains elements from $E_b$. The mathematical problem asks to recover the ground truth group elements $\{g_i^*\}_{i \in [n]}$ up to ambiguous group action. Different from directly estimating $\{g_i^*\}_{i \in [n]}$, the goal the techniques described herein is to exactly separate $E_g$ and $E_b$ so that the exact recovery can be guaranteed using any subsequent estimator. Note that E may not include all the pairs of indices, so that some values can be missing. Longer loops generally contains more uncertainties and thus shorter loops are preferable. For each ij∈E, let $C_{ij} := \{k \in [n] : ki, kj \in E\}$ and define inconsistency vector for edge ij as $d_{ij} \in \mathbb{R}^{|C_{ij}|}$, where for k∈$C_{ij}$, $$d_{ij}(k) = d\mathcal{G}(g_{ij} g_{jk} g_{ki}, e). \tag{5}$$

The naive inconsistency score (NIS) of an edge ij∈E is defined as the average of the loop inconsistencies $\mathcal{I}_{ij,k}$ over the set $C_{ij}$. That is, $$s_{ij}^0 = \frac{1}{|C_{ij}|} \sum_{k \in C_{ij}} d_{ij}(k). \tag{6}$$

This is as an indication for the corruption level of $g_{ij}$ and thus remove the edges with largest inconsistency scores. However, $s_{ij}^0$ usually cannot exactly separate $E_g$ and $E_b$. For an uncorrupted relative measurement $g_{ij}$, its inconsistency with respect to $g_{jk}$ and $g_{ki}$ can be unreasonably high if either $g_{jk}$ or $g_{ki}$ is severely corrupted. Moreover, if many adjacent edges of ij are corrupted, then NIS of this edge may not accurately measure its corruption level. Thus, only the triangles with uncorrupted $g_{ik}^*$ and $g_{jk}^*$ should be considered. Indeed, let the set $G_{ij} = \{k, ik, jk \in E_g\}$, then it can be easily verified that $$s_{ij}^* := \frac{1}{|G_{ij}|} \sum_{k \in G_{ij}} d_{ij}(k) = d_\mathcal{G}(g_{ij} g_{ij}^{*-1}, e). \tag{7}$$

That is, the NIS, when restricting on only triangles containing correct information, gives the true corruption error. However, the hurdle is that set $G_{ij}$ is unknown. Motivated by this issue, a toy algorithm is presented that provides linear convergence to $s_{ij}^*$ under certain deterministic conditions.

A simple algorithm is presented that alternatedly update the inconsistency score $s_{ij}^{(t)}$ and the selected set of triangles $A_{ij}^{(t)}$. Specifically, $s_{ij}^{(t)}$ is the averaged cycle-inconsistency over the selected set $A_{ij}^{(t)}$, while $A_{ij}^{(t)}$ is selected as "good" triangles with low $s_{ij}^{(t-1)}$ and $s_{jk}^{(t-1)}$. In fact, it is theoretically guaranteed that the convergence of this algorithm.

Let $S_{ij}^t$ be the refined inconsistency score of edge ij∈E at iteration t. Let $G_{ij}^t := \{k \in C_{ij} : ik, jk \in E_g\}$, and $B_{ij}^t := A_{ij}^t \setminus G_{ij}$. $\lambda_{ij}^t := |G_{ij}|/|A_{ij}^t|$, and $\lambda^t := \min_{ij \in E} \lambda_{ij}^t$. Similarly, $\lambda_{ij} := |G_{ij}|/|C_{ij}|$, and $\lambda := \min_{ij \in E} \lambda_{ij}$, and $b_{ij}^t := |B_{ij}^t|/|C_{ij}|$. Also, the inconsistency score restricted on $G_{ij}$ and $B_{ij}^t$ are respectively defined as $$S_{ij}^* := \frac{1}{|G_{ij}|} \sum_{k \in G_{ij}} \mathcal{J}_{ij,k} Z_{ij}^t := \frac{1}{|B_{ij}^t|} \sum_{k \in B_{ij}^t} \mathcal{J}_{ij,k}.$$

At last, for any $ij \in E$ the following function $f_{ij}(X) := |\{\notin G_{ij}: S_{ik}^*, S_{jk}^* < x\}|/|C_{ij}|$.

Lemma 1 If $d\mathcal{G}$ is bi-invariant, then for all $k \in C_{ij}$, $$|d_{ij}(k) - e_{ij}| \le e_{jk} + e_{ki}. \tag{8}$$

Proof.

$$|d_{ij}(k) - e_{ij}| =$$

$$\left| d_{\mathcal{G}}(g_{ij} g_{jk} g_{ki}, e) - d_{\mathcal{G}}(g_{ij} g_{ij}^{*-1}, e) \right| \le d_{\mathcal{G}}(g_{ij} g_{jk} g_{ki}, g_{ij} g_{ij}^{*-1}) =$$

$$d_{\mathcal{G}}(g_{ij}^* g_{jk} g_{ki}, e) \le d_{\mathcal{G}}(g_{ij}^* g_{jk} g_{ki}, g_{ij}^* g_{jk}^* g_{ki}) + d_{\mathcal{G}}(g_{ij}^* g_{jk}^* g_{ki}, e) =$$

$$d_{\mathcal{G}}(g_{jk} g_{jk}^{*-1}, e) + d_{\mathcal{G}}(g_{ki} g_{ki}^{*-1}, e) = e_{jk} + e_{ki}$$

Lemma 2 If $\max_{ij \in E} |B_{ij}|/|C_{ij}| < 0.2$, then by taking $\tau_{t+1} = r\tau_t$ for any $$4\max_{ij \in E} \frac{|B_{ij}|}{|G_{ij}|} < r < 1$$

and $\tau_0 = rM$, for all $t \ge 0$, $$\|s^{(t+1)} - s^*\|_\infty \le \max_{ij \in E} \frac{2|B_{ij}|}{|G_{ij}|} \cdot \frac{1}{\tau_t}. \tag{9}$$

Proof. Rewrite $S_{ij}^{(t+1)}$ as follows.

$$s_{ij}^{(t+1)} = \frac{\sum_{k \in C_{ij}} 1_{\{s_{ik}^{(t)}, s_{jk}^{(t)} \le \tau_t\}} d_{ij}(k)}{\sum_{k \in C_{ij}} 1_{\{s_{ik}^{(t)}, s_{jk}^{(t)} \le \tau_t\}}}. \tag{10}$$

Then $$|s_{ij}^{(t+1)} - s_{ij}^*| \le \frac{\sum_{k \in C_{ij}} 1_{\{s_{ik}^{(t)}, s_{jk}^{(t)} \le \tau_t\}} |d_{ij}(k) - e_{ij}|}{\sum_{k \in C_{ij}} 1_{\{s_{ik}^{(t)}, s_{jk}^{(t)} \le \tau_t\}}} \tag{11}$$

$$= \frac{\sum_{k \in B_{ij}} 1_{\{s_{ik}^{(t)}, s_{jk}^{(t)} \le \tau_t\}} |d_{ij}(k) - e_{ij}|}{\sum_{k \in C_{ij}} 1_{\{s_{ik}^{(t)}, s_{jk}^{(t)} \le \tau_t\}}} \tag{12}$$

Combining this with Lemma 1, $$|s_{ij}^{(t+1)} - s_{ij}^*| \le \frac{2 \sum_{k \in B_{ij}} 1_{\{s_{ik}^{(t)}, s_{jk}^{(t)} \le \tau_t\}} \max\{s_{ik}^*, s_{jk}^*\}}{\sum_{k \in C_{ij}} 1_{\{s_{ik}^{(t)}, s_{jk}^{(t)} \le \tau_t\}}} \tag{13}$$

$$\le \frac{2 \sum_{k \in B_{ij}} 1_{\{s_{ik}^{(t)}, s_{jk}^{(t)} \le \tau_t\}} (\max\{s_{ik}^{(t)}, s_{jk}^{(t)}\} + \max\{|s_{ik}^{(t)} - s_{ik}^*|, |s_{jk}^{(t)} - s_{jk}^*|\})}{\sum_{k \in C_{ij}} 1_{\{s_{ik}^{(t)}, s_{jk}^{(t)} \le \tau_t\}}} \tag{14}$$

$$\le \frac{2 \sum_{k \in B_{ij}} 1_{\{s_{ik}^{(t)}, s_{jk}^{(t)} \le \tau_t\}} (\tau_t + \|s^{(t)} - s^*\|_\infty)}{\sum_{k \in C_{ij}} 1_{\{s_{ik}^{(t)}, s_{jk}^{(t)} \le \tau_t\}}}. \tag{15}$$

By letting $\tau_t \ge \|s^{(t)} - s^*\|_\infty$, for $ij \in E_g, s_{ij}^{(t)} \le s_{ij}^* + \tau_t = \tau_t$.

Thus, for all $ij \in E$, $$\sum_{k \in C_{ij}} 1_{\{s_{ik}^{(t)}, s_{jk}^{(t)} \le \tau_t\}} \ge |G_{ij}| \tag{16}$$

and $$|s_{ij}^{(t+1)} - s_{ij}^*| \le \frac{4|B_{ij}|\tau_t}{|G_{ij}|}. \tag{17}$$

At last, taking maximum over $ij \in E$ yields $$\|s^{(t+1)} - s^*\|_\infty \le 4 \max_{ij \in E} \frac{|B_{ij}|}{|G_{ij}|} \tau_t. \tag{18}$$

On the next iteration, $\tau_{t+1} \ge \|s^{(t+1)} - s^*\|_\infty$. That is, $$\tau_{t+1} \ge 4 \max_{ij \in E} \frac{|B_{ij}|}{|G_{ij}|} \tau_t. \tag{19}$$

and this concludes the proof given that $\max_{ij \in E} |B_{ij}|/|G_{ij}| < \frac{1}{4}$, which makes sure that $\tau_t$ is decreasing.

The task of separating corrupted and uncorrupted edges can be viewed as the following prediction problem, where a mapping of $\mathcal{W}$ is such that $$(I_{ij,k})_{ij \in E, k \in C_{ij}} \xrightarrow{\mathcal{W}} (e_{ij})_{ij \in E}, \tag{20}$$

Or equivalently for each $ij \in E$, a mapping of $\mathcal{W}_{ij}$ is such that $$I_{ij} := (I_{ij,k})_{k \in C_{ij}} \xrightarrow{\mathcal{W}_{ij}} e_{ij}. \tag{21}$$

Since $I_{ij,k} = e_{ij}$ for $k \in G_{ij}$, it is natural to consider $\mathcal{W}_{ij}$ as a linear function such that $$\mathcal{W}_{ij}(I_{ij}) = w_{ij}^T I_{ij}, \tag{22}$$

where $w_{ij} \in \mathbb{R}^{|G_{ij}|}$ and $w_{ij}(k) = I(k \in G_{ij}/|G_{ij}|$. The reason is that for $k \in G_{ij}$, the $I_{ij,k}$ reflects the corruption level of $g_{ij}$. On the other hand, for $k \in C_{ij} \setminus G_{ij}$, $I_{ij,k}$ may contain certain level of wrong information since at least one of $g_{ik}$ and $g_{jk}$ is corrupted. However, $E_g$ is limited, thus directly computing such $w_{ij}$, or equivalently $I(ik \in E_g) \cdot (jk \in E_g)$ for each k, is impossible. However, there exists an iterative procedure such that the weight $w_{ij}{}^t(k) \to w_{ij}(k) = I(k \in G_{ij})/|G_{ij}|$ linearly. $S_{ij}{}^t$ may be rewritten as a weighted sum of the loop inconsistencies.

$$S_{ij}{}^t = \Sigma_{k \in C_{ij}} w_{ij,k}{}^t I_{ij,k}. \tag{23}$$

The weights $w_{ij,k}{}^t := \tilde{w}_{ij,k}{}^t / \Sigma_{k \in C_{ij}} \tilde{w}_{ij,k}{}^t$ where $\tilde{w}_{ij,k}{}^t = I(S_{ik}{}^t, S_{jk}{}^t < \tau^t)$. However, the thresholding function $I(x,y < \tau^t)$ gives equal weights whenever $S_{ik}, S_{jk} < \tau^t$. Instead, replace $I(X,y < \tau^t)$ with a generalized function $f^t(x,y)$ such that it reflects the probability $Pr(ik, jk \in E_g | S_{ik}{}^t = x, S_{jk}{}^t = y)$. With this generalized reweighting function, although the definition of $S_{ij}{}^t$ is changed, $S_{ij}{}^t$ may be rewritten as the convex combination of ground truth $S_{ij}{}^*$ and the noise component $Z_{ij}{}^t$. Indeed, $$S_{ij}{}^t = \lambda_{ij}{}^t S_{ij}{}^* + (1 - \lambda_{ij}{}^t) Z_{ij}{}^t, \tag{24}$$

Where $$S_{ij}^* = \sum_{k \in G_{ij}} \frac{\tilde{w}_{ij,k}^t}{\sum_{l \in G_{ij}} \tilde{w}_{ij,l}^t} I_{ij,k} = \sum_{k \in G_{ij}} \frac{\tilde{w}_{ij,k}^t}{\sum_{l \in G_{ij}} \tilde{w}_{ij,l}^t} e_{ij} = e_{ij}, \tag{25}$$

$$Z_{ij}^t = \sum_{k \in C_{ij} \backslash G_{ij}} \frac{\tilde{w}_{ij,k}^t}{\sum_{l \in C_{ij} \backslash G_{ij}} \tilde{w}_{ij,l}^t} I_{ij,k}, \tag{26}$$

$$\lambda_{ij}^t = \frac{\sum_{k \in G_{ij}} \tilde{w}_{ij,k}^t}{\sum_{l \in C_{ij}} \tilde{w}_{ij,l}^t}. \tag{27}$$

The reweighting procedure is such that $w_{ij,k}{}^t = Pr(ik, jk \in E_g | S_{ik}{}^t, S_{jk}{}^t)$ to a belief propagation process. In particular, the weight $w_{ij,k}{}^t$ is the probability that $I_{ij,k} = S_{ij}{}^*$ given the inconsistency score computed in the last iteration. That is, $$S_{ij}^{t+1} = \sum_{k \in C_{ij}} \frac{Pr(I_{ij,k} = S_{ij}^* | S_{ik}^t, S_{jk}^t)}{\sum_{l \in C_{ij}} Pr(I_{ij,l} = S_{ij}^* | S_{il}^t, S_{jl}^t)} I_{ij,k}. \tag{28}$$

Note that $$Pr(I_{ij,k} = S_{ij}^* | S_{ik}^*, S_{jk}^*) = 1(S_{ik}^*, S_{jk}^* = 0) = 1(ik, jk \in E_g). \tag{29}$$

This implies that if $S_{ik}{}^t \to S_{ik}{}^*$ and $S_{j}{}^t \to S_{jk}{}^*$ for all $k \in C_{ij}$, then $$S_{ij}^t \to \sum_{k \in C_{ij}} \frac{1(ik, jk \in E_g)}{\sum_{k \in C_{ij}} 1(ik, jk \in E_g)} I_{ij,k} = \frac{1}{|G_{ij}|} \sum_{k \in G_{ij}} I_{ij,k} = S_{ij}^*. \tag{30}$$

To further investigate the form of $w_{ij,k}$, consider a special probabilistic model. Assuming that the graph is generated by the Erdos-Renyi model $G([n], p)$ and an edge is corrupted i.i.d. with probability q, then for each $ij \in E$ $$Pr(ij \in E_g | S_{ij}^t = x) = \frac{(1-q) p_g(S_{ij}^t = x)}{(1-q) p_g(S_{ij}^t = x) + q p_b(S_{ij}^t = x)} \tag{31}$$

$$= \left(1 + \frac{q}{1-q} \cdot \frac{p_b(S_{ij}^t = x)}{p_g(S_{ij}^t = x)}\right)^{-1}. \tag{32}$$

where $p_g{}^t$ and $p_b{}^t$ are probability density function of $S_{ij}{}^t$ conditioned on the events $ij \in E_g$ and $ij \in E_b$ respectively. Thus the priori $p_b$ and $p_g$ may be further investigated. Recall that the refined inconsistency score can be decomposed as the convex combination of ground truth $S_{ij}{}^*$ and noise $Z_{ij}{}^t$. Recall that $$S_{ij}{}^t = \lambda_{ij}{}^t S_{ij}{}^* + (1 + \lambda_{ij}{}^t) Z_{ij}{}^t \tag{33}$$

Note that for $ij \in E_g$, $S_{ij}{}^t \in [0, M(1-\lambda_{ij}{}^t)]$ and for $ij \in E_b$, $S_{ij} \in [0,M]$. First assume that $S_{ij}{}^* \sim \text{Unif}([0, M(1-\lambda_{ij}{}^t)])$ and $\text{Unif}([0, M])$ respectively for $ij \in E_g$ and $ij \in E_b$. In this case, $$Pr(ij \in E_g | S_{ij}^t = x) = \left(1 + \frac{q}{1-q} \cdot (1 - \lambda_{ij}^t)\right)^{-1} \cdot I(x < M(1 - \lambda_{ij}^t)). \tag{34}$$

This implies that $$Pr(ik, jk \in E_g | S_{ik}^t = x, S_{jk}^t = y) \tag{35}$$

$$= \left(\left(1 + \frac{q}{1-q}(1 - \lambda_{ik}^t)\right)\left(1 + \frac{q}{1-q}(1 - \lambda_{jk}^t)\right)\right)^{-1} \tag{36}$$

$$I(x < M(1 - \lambda_{ik}^t), y < M(1 - \lambda_{jk}^t))$$

In practice, the number of parameters may be reduced by letting $\lambda_{ij}{}^t = \lambda^t$ for $ij \in E$. It is notable that the uniform priori assumption is oversimplified and may not be sufficient to approximate the true posterior $Pr(k \in G_{ij} | S_{ik}{}^t, S_{jk}{}^t)$. Surprisingly on the theoretical side, with this inappropriate prior distribution, there still is the ground truth under certain deterministic conditions using a properly chosen parameter sequence $\{\tau_t\}$. This result indicates that the form of the prior distributions $p_g$ and $p_d$ is not critical. In fact, the fact that $I_{ij,k} = 0$ for $ij \in E_g$ and $k \in G_{ij}$ plays an important role, which is independent of the priori assumptions. However, the most important Assume that for $ij \in E_b$ the $S_{ij}{}^*$ approximately follows normal distribution $N(\mu_1, \sigma_1{}^2)$. For $ij \in E$, and $k \in C_{ij} \backslash G_{ij}$, assume that $I_{ij,k}$ i.i.d. $\sim N(\mu_2, \sigma_2{}^2)$. That is $$S_{ij}{}^t = \lambda_{ij}{}^t S_{ij}{}^* + (1 - \lambda_{ij}{}^t) Z_{ij}{}^t, \tag{37}$$

where $S_{ij}{}^* = 0$ for $ij \in E_g$, $S_{ij}{}^* \sim N(\mu_1, \sigma_1{}^2)$ for $ij \in E_b$ and $Z_{ij}{}^t \sim N(\mu_2, \sigma(n)^2)$ for n sufficiently large. Note that by central limit theorem, $\sigma(n) \to 0$ as $n \to \infty$.

$$S_{ij}^t \sim \begin{cases} N((1 - \lambda_{ij}^t)\mu_2, (1 - \lambda_{ij}^t)^2 \sigma_2(n)^2), & ij \in E_g; \\ N(\lambda_{ij}^t \mu_1 + (1 - \lambda_{ij}^t)\mu_2, \lambda_{ij}^{t2} \sigma_1^2 + (1 - \lambda_{ij}^t)^2 \sigma_2(n)^2), & ij \in E_b. \end{cases} \tag{38}$$

Then, $$\frac{p_b(S_{ij}^t = x)}{p_g(S_{ij}^t = x)} \propto \exp\left(\frac{(x - (1 - \lambda_{ij}^t)\mu_2)^2}{2(1 - \lambda_{ij}^t)^2 \sigma(n)^2} - \frac{(x - \lambda_{ij}^t \mu_1 - (1 - \lambda_{ij}^t)\mu_2)^2}{2\lambda_{ij}^{t2} \sigma_1^2 + (1 - \lambda_{ij}^t)^2 \sigma(n)^2}\right) \tag{39}$$

$$\propto \exp\left(\frac{(x - \mu)^2}{2\sigma^2}\right) \tag{40}$$

where $$\sigma^2 = \left(\frac{1}{(1 - \lambda_{ij}^t)^2 \sigma_2(n)^2} - \frac{1}{\lambda_{ij}^{t2} \sigma_1^2 + (1 - \lambda_{ij}^t)^2 \sigma_2(n)^2}\right)^{-1}$$

and $$\mu = \frac{((1-\lambda_{ij}^t)\mu_2) - ((1-\lambda_{ij}^t)^2\sigma(n)^2)(\lambda_{ij}^t\mu_1 + (1-\lambda_{ij}^t)\mu_2)}{2\lambda_{ij}^{t2}\sigma_1^2}$$

Note that $\mu < 0$ if and only if $$\lambda_{ij}^t < \left(\frac{\mu_2\sigma_1^2}{\mu_1\sigma_2(n)^2} + 1\right)^{-1}.$$

Assume that $d_{ij} \in [0, M]^{|C_{ij}|}$, and $\max_{ij \in E} |B_{ij}|/|C_{ij}| < 0.2$. There exists an increasing sequence $\{\tau_t\}_{t \geq i}$ such that $S^t$ linearly converges to $s^*$ in $\ell_\infty$ norm.

$$s_{ij}^{(t+1)} = \frac{\sum_{k \in C_{ij}} e^{-\tau_t \max\{s_{ik}^{(t)}, s_{jk}^{(t)}\}} d_{ij}(k)}{\sum_{k \in C_{ij}} e^{-\tau_t \max\{s_{ik}^{(t)}, s_{jk}^{(t)}\}}}. \tag{41}$$

Then $$|s_{ij}^{(t+1)} - s_{ij}^*| \leq \frac{\sum_{k \in C_{ij}} e^{-\tau_t \max\{s_{ik}^{(t)}, s_{jk}^{(t)}\}} |d_{ij}(k) - e_{ij}|}{\sum_{k \in C_{ij}} e^{-\tau_t \max\{s_{ik}^{(t)}, s_{jk}^{(t)}\}}} \tag{42}$$

$$= \frac{\sum_{k \in B_{ij}} e^{-\tau_t \max\{s_{ik}^{(t)}, s_{jk}^{(t)}\}} |d_{ij}(k) - e_{ij}|}{\sum_{k \in C_{ij}} e^{-\tau_t \max\{s_{ik}^{(t)}, s_{jk}^{(t)}\}}}. \tag{43}$$

Combining this with Lemma 1, $$|s_{ij}^{(t+1)} - s_{ij}^*| \leq \frac{2\sum_{k \in B_{ij}} e^{-\tau_t \max\{s_{ik}^{(t)}, s_{jk}^{(t)}\}} \max\{s_{ik}^*, s_{jk}^*\}}{\sum_{k \in C_{ij}} e^{-\tau_t \max\{s_{ik}^{(t)}, s_{jk}^{(t)}\}}} \tag{44}$$

$$\leq \frac{2\sum_{k \in B_{ij}} e^{-\tau_t \max\{s_{ik}^*, s_{jk}^*\}} e^{\tau_t \max\{|s_{ik}^{(t)} - s_{ik}^*|, |s_{jk}^{(t)} - s_{jk}^*|\}} \max\{s_{ik}^*, s_{jk}^*\}}{\sum_{k \in C_{ij}} e^{-\tau_t \max\{s_{ik}^*, s_{jk}^*\}} e^{-\tau_t \max\{|s_{ik}^{(t)} - s_{ik}^*|, |s_{jk}^{(t)} - s_{jk}^*|\}}} \tag{45}$$

$$\leq \frac{2\sum_{k \in B_{ij}} e^{-\tau_t \max\{s_{ik}^*, s_{jk}^*\}} e^{\tau_t \|s^t - s^*\|_\infty} \max\{s_{ik}^*, s_{jk}^*\}}{|G_{ij}| e^{-\tau_t \|s^t - s^*\|_\infty}}. \tag{46}$$

Since $$xe^{-\alpha x} \leq \frac{1}{e\alpha}$$

for $X \geq 0$ and $\alpha > 0$, by letting $x = \max\{s_{ik}^*, s_{jk}^*\}$ and $\alpha = \tau_t$, $$|s_{ij}^{(t+1)} - s_{ij}^*| \leq \frac{2|B_{ij}|e^{2\tau_t \|s^t - s^*\|_\infty}}{e|G_{ij}|\tau_t}. \tag{47}$$

By letting $$\tau_t = \frac{1}{2\|s^{(t)} - s^*\|_\infty},$$

$$|s_{ij}^{(t+1)} - s_{ij}^*| \leq \frac{4|B_{ij}|\|s^{(t)} - s^*\|_\infty}{|G_{ij}|}. \tag{48}$$

At last, taking maximum over $ij \in E$ yields $$\|s^{(t+1)} - s^*\|_\infty \leq 4\max_{ij \in E} \frac{|B_{ij}|}{|G_{ij}|} \|s^{(t)} - s^*\|_\infty, \tag{49}$$

and this concludes the proof given that $\max_{ij \in E} |B_{ij}|/|G_{ij}| < 1/4$.

If $\max_{ij \in E} |B_{ij}|/|C_{ij}| < 0.2$, then by taking $\tau_{t+1} = r\tau_t$ for any number $$1 < r < \min_{ij \in E} \frac{|G_{ij}|}{4|B_{ij}|}$$

and $$\tau_0 \leq \frac{1}{2M},$$

for all $t \geq 0$, $$\|s^{(t+1)} - s^*\|_\infty \leq \max_{ij \in E} \frac{2|B_{ij}|}{|G_{ij}|} \cdot \frac{1}{\tau_t}. \tag{50}$$

Proof: First recall that for $\tau_t \leq C \|s^t - s^*\|_\infty^{-1}$ $$|s_{ij}^{(t+1)} - s_{ij}^*| \leq \frac{2|B_{ij}|e^{2\tau_t \|s^t - s^*\|_\infty}}{e|G_{ij}|\tau_t} \leq \frac{2|B_{ij}|e^{2C-1}}{|G_{ij}|} \cdot \frac{1}{\tau_t}. \tag{51}$$

Taking maximum over $ij \in E$ yields $$\|s^{(t+1)} - s^*\|_\infty \leq \max_{ij \in E} \frac{2|B_{ij}|e^{2C-1}}{|G_{ij}|} \cdot \frac{1}{\tau_t}. \tag{52}$$

On the next iteration, $$\tau_{t+1}\|s^{(t+1)} - s^*\|_\infty \leq \max_{ij \in E} \frac{2|B_{ij}|e^{2C-1}}{|G_{ij}|} \cdot \frac{\tau_{t+1}}{\tau_t} \leq C. \quad (53)$$

That is, for $C>0$, $$\frac{\tau_{t+1}}{\tau_t} \leq \min_{ij \in E} \frac{|G_{ij}|}{2|B_{ij}|} \cdot Ce^{1-2C}. \quad (54)$$

Choose $C=\frac{1}{2}$ that maximizes the RHS, and this results in $$\frac{\tau_{t+1}}{\tau_t} \leq \min_{ij \in E} \frac{|G_{ij}|}{|B_{ij}|}. \quad (55)$$

Thus, by induction, if $\max_{ij \in E} |B_{ij}|/|G_{ij}| < \frac{1}{4}$, then by taking $\tau_{t+1} = r\tau_t$ for any $$1 < r < \min_{ij \in E} \frac{|G_{ij}|}{4|B_{ij}|}$$

and $$\tau_0 \leq \frac{1}{2\|s^{(0)} - s^*\|_\infty},$$

then for all $t \geq 0$, $$\|s^{(t+1)} - S^*\|_\infty \leq \max_{ij \in e} \frac{2|B_{ij}|}{|G_{ij}|} \cdot \frac{1}{\tau_t}. \quad (56)$$

This concludes the theorem.

Assume that $d_{ij} \in [0,M]^{|C_{ij}|}$, and for each $ij \in E$, let $\hat{F}_{ij}(X): [0, M] \to [0,1]$ be the empirical distribution of $\max(s_{ik}^*, s_{jk}^*)$. If there exists $h(x) \in C^1$ such that $$\sup_{ij \in E} \hat{F}_{ij}(x) \leq h(x) \text{ and } h(0) = 0,$$

then the following inequality holds:

$$1 - \lambda^{t+1} \leq \frac{1-\lambda}{\lambda} \cdot \frac{\mathcal{L}[h'](\tau^t \lambda^t)}{\exp(-\tau^t M(1-\lambda^t))}, \quad (57)$$

where $\mathcal{L}$ denotes Laplace transform.

Proof By definition of $\lambda_{ij}^t$, for any $ij \in E$, $$1 - \lambda_{ij}^{t+1} = \frac{\sum_{k \in C_{ij} \setminus G_{ij}} \tilde{w}_{ij}^{t+1}(k)}{\sum_{l \in C_{ij}} \tilde{w}_{ij}^{t+1}(l)} = \frac{\sum_{k \in C_{ij} \setminus G_{ij}} \exp(-\tau^t \max(s_{ik}^t, s_{jk}^t))}{\sum_{l \in C_{ij}} \exp(-\tau^t \max(s_{ik}^t, s_{jk}^t))} \leq \quad (58)$$

$$\frac{\sum_{k \in C_{ij} \setminus G_{ij}} \exp(-\tau^t \max(\lambda_{ik}^t s_{ik}^*, \lambda_{jk}^t s_{jk}^*))}{\sum_{l \in G_{ij}} \exp(-\tau^t \max(M(1-\lambda_{ik}^t), M(1-\lambda_{jk}^t)))} \leq$$

$$\frac{\sum_{k \in C_{ij} \setminus G_{ij}} \exp(-\tau^t \lambda^t \max(s_{ik}^*, s_{jk}^*))}{|G_{ij}|\exp(-\tau^t M(1-\lambda^t))}.$$

Next, an upper bound for the numerator of (58) is shown.

$$\frac{1}{|C_{ij} \setminus G_{ij}|} \sum_{k \in C_{ij} \setminus G_{ij}} \exp(-\tau^t \lambda^t \max(s_{ik}^*, s_{jk}^*)) = \quad (59)$$

$$\frac{1}{|C_{ij} \setminus G_{ij}|} \sum_{k \in C_{ij} \setminus G_{ij}} \int_0^1 1_{\{\exp(-\tau^t \lambda^t \max(s_{ik}^*, s_{jk}^*)) > x\}} dx =$$

$$\int_0^1 \frac{\sum_{k \in C_{ij} \setminus G_{ij}} 1_{\{\exp(-\tau^t \lambda^t \max(s_{ik}^*, s_{jk}^*)) > x\}}}{|C_{ij} \setminus G_{ij}|} dx =$$

$$\int_0^1 \frac{\sum_{k \in C_{ij} \setminus G_{ij}} 1_{\{\max(s_{ik}^*, s_{jk}^*) < -\frac{1}{\lambda^t \tau^t} \log x\}}}{|C_{ij} \setminus G_{ij}|} dx \leq$$

$$\int_0^1 \hat{F}_{ij}\left(-\frac{1}{\lambda^t \tau^t} \log x\right) dx \leq \int_0^1 h\left(-\frac{1}{\lambda^t \tau^t} \log x\right) dx.$$

Changing variable $$y = -\frac{1}{\lambda^t \tau^t} \log x$$

yields $$\frac{1}{|C_{ij} \setminus G_{ij}|} \sum_{k \in C_{ij} \setminus G_{ij}} \exp(-\tau^t \lambda^t \max(s_{ik}^*, s_{jk}^*)) \leq \int_0^\infty h(y) \tau^t \lambda^t e^{-\tau^t \lambda^t y} dy. \quad (60)$$

By integration by parts and the fact that $h(0)=0$, $$\frac{1}{|C_{ij} \setminus G_{ij}|} \sum_{k \in C_{ij} \setminus G_{ij}} \exp(-\tau^t \lambda^t \max(s_{ik}^*, s_{jk}^*)) \leq \int_0^\infty e^{-\tau^t \lambda^t y} h'(y) dy = \quad (61)$$

$$\mathcal{L}[h'](\tau^t \lambda^t).$$

By plugging in (61) into (58), $$1 - \lambda_{ij}^{t+1} \leq \frac{|C_{ij} \setminus G_{ij}|}{|G_{ij}|} \cdot \frac{\mathcal{L}[h'](\tau^t \lambda^t)}{\exp(-\tau^t M(1-\lambda^t))} = \quad (62)$$

$$\frac{1-\lambda_{ij}}{\lambda_{ij}} \cdot \frac{\mathcal{L}[h'](\tau^t \lambda^t)}{\exp(-\tau^t M(1-\lambda^t))} \leq \frac{1-\lambda}{\lambda} \cdot \frac{\mathcal{L}[h'](\tau^t \lambda^t)}{\exp(-\tau^t M(1-\lambda^t))}.$$

Taking the maximum over $ij \in E$ on the LHS of (62) concludes the Lemma.

Assume that $d_{ij} \in [0, M]^{|C_{ij}|}$, and for each $ij \in E$, let $\hat{F}_{ij}(X): [0, M] \to [0, 1]$ be the empirical distribution of $\max(s_{ik}^*, s_{jk}^*)$ for $k \in C_{ij} \backslash G_{ij}$. If for some $\delta > 0$ and $\alpha \geq 1$, $$\sup_{ij \in E} \hat{F}_{ij}(x) \leq \delta x^\alpha \text{ and } \frac{\lambda^{1+\alpha}}{1-\lambda} > e\delta\alpha\Gamma(\alpha)M^\alpha$$

then there exists an increasing sequence $\{\tau^t\}$ such that $s^t$ converges to $s^*$ in $\ell_\infty$ norm and $$\|s^{(t)} - s^*\|_\infty \leq \begin{cases} M(C(1-\lambda))^t & \alpha = 1 \\ MC^{\frac{\alpha^t - 1}{\alpha - 1}}(1-\lambda)^{\alpha^t} & \alpha > 1 \end{cases},$$

where $$C = \frac{e\delta\alpha\Gamma(\alpha)M^\alpha(1-\lambda)}{\lambda^{1+\alpha}} < 1.$$

Proof.

$$\tau^t = \frac{1}{M(1-\lambda^t)}$$

is an appropriate choice. By applying $$\tau^t = \frac{1}{M(1-\lambda^t)}$$

and $h(x) = \delta x^\alpha$ to (57), for $t \geq 0$, $$1 - \lambda^{t+1} \leq \frac{e\delta\alpha\Gamma(\alpha)M^\alpha(1-\lambda)}{\lambda} \cdot \left(\frac{1-\lambda^t}{\lambda^t}\right)^\alpha. \quad (63)$$

Using the theorem by induction, assume that the following is true:

$$1 - \lambda^t \leq \frac{e\delta\alpha\Gamma(\alpha)M^\alpha(1-\lambda)}{\lambda^{1+\alpha}} \cdot (1-\lambda^{t-1})^\alpha \text{ and } \lambda^t \geq \lambda. \quad (64)$$

By applying the condition $$\frac{e\delta\alpha\Gamma(\alpha)M^\alpha(1-\lambda)}{\lambda^{1+\alpha}} < 1,$$

for $$C = \frac{e\delta\alpha\Gamma(\alpha)M^\alpha(1-\lambda)}{\lambda^{1+\alpha}} < 1,$$

$$1 - \lambda^t \leq C(1-\lambda^{t-2})\alpha \text{ and } \lambda^t \geq \lambda. \quad (65)$$

By applying (63) and then the assumption $\lambda^t \geq \lambda$.

$$1 - \lambda^{t+1} \leq \frac{e\delta\alpha\Gamma(\alpha)M^\alpha(1-\lambda)}{\lambda} \cdot \left(\frac{1-\lambda^t}{\lambda^t}\right)^\alpha \quad (66)$$

$$\leq \frac{e\delta\alpha\Gamma(\alpha)M^\alpha(1-\lambda)}{\lambda^{1+\alpha}} \cdot (1-\lambda^t)^\alpha \quad (67)$$

$$= C(1-\lambda^t)^\alpha, \quad (68)$$

and $\lambda^{t+1} \geq \lambda$ follows from $\lambda^{t+1} \geq \lambda^t$, which follows by combining the inequality above and $C < 1$. Thus, by induction, it suffices to show that the assumption (65) is true at $t=1$. For $t=1$, the first inequality of (65) follows directly from (63) and the condition $$\frac{e\delta\alpha\Gamma(\alpha)M^\alpha(1-\lambda)}{\lambda^{1+\alpha}} < 1.$$

This results in $\lambda^1 \geq \lambda^0$ and thus concludes the second inequality of (63) since $\lambda^0 = \lambda$. Indeed, by the definition of NIS, $$\lambda^0 = \min_{ij \in E} \lambda_{ij}^0 = \min_{ij \in E} \frac{|G_{ij}|}{|C_{ij}|} = \min_{ij \in E} \lambda_{ij} = \lambda.$$

Thus, for all $t \geq 0$ and $$C = \frac{e\delta\alpha\Gamma(\alpha)M^\alpha(1-\lambda)}{\lambda^{1+\alpha}} < 1$$

$$1 - \lambda^{(t)} \leq C(1-\lambda^{(t-1)})^\alpha \leq \begin{cases} (C(1-\lambda))^t & \alpha = 1 \\ C^{\frac{\alpha^t-1}{\alpha-1}}(1-\lambda)^{\alpha^t} & \alpha > 1, \end{cases}.$$

For all $ij \in E$, $$|s_{ij}^{(t)} - s_{ij}^*| = (1 - \lambda_{ij}^{(t)}) \cdot |s_{ij}^* - z_{ij}^{(t)}| \leq M(1 - \lambda_{ij}^{(t)}) \leq M(1 - \lambda^{(t)}). \quad (70)$$

Taking the maximum on the LHS of (70) and combining (69) concludes the theorem.

Assume that $d_{ij} \in [0, M]^{|C_{ij}|}$, and the corruption error $\{e_{ij} := g_{ij} g_{ij}^{*-1}\}_{ij \in E}$ are i.i.d. from uniform distribution on $[0, M]$. If for some $\delta > 0$ and $\alpha \geq 1$, $$\sup_{ij \in E} \hat{F}_{ij}(x) \leq \delta x^\alpha \text{ and } \frac{\lambda^{1+\alpha}}{1-\lambda} > e\delta\alpha\Gamma(\alpha)M^\alpha$$

then there exists an increasing sequence $\{\tau^t\}$ such that $s^t$ converges to $s^*$ in $\ell_\infty$ norm and $$\|s^{(t)} - s^*\|_\infty \leq \begin{cases} M(C(1-\lambda))^t & \alpha = 1 \\ MC^{\frac{\alpha^t-1}{\alpha-1}}(1-\lambda)^{\alpha^t} & \alpha > 1 \end{cases},$$

where $$C = \frac{e\delta\alpha\Gamma(\alpha)M^\alpha(1-\lambda)}{\lambda^{1+\alpha}} < 1.$$

In order to establish theoretical guarantees in a random setting, where each group ratio $g_{ij}$ also contains random noise, assume that the group ratios are corrupted by the following Corruption Model CM (n, p, q, σ) Let $V=\{g_i\}_{i\in[n]}$ be generated by certain i.i.d. distribution and let G(V,E) be a graph generated by the Erdös-Rényi model G(n,p), where p denotes the connection probability among edges. For any ij∈E, a corrupted group ratio $g_{ij}$ is generated by $$\gamma_{ij} = \begin{cases} v_{ij}, & w \cdot p \cdot q; \\ \frac{\gamma_{ij}^* + \sigma\epsilon_{ij}}{\|\gamma_{ij}^* + \sigma\epsilon_{ij}\|}, & w \cdot p \cdot 1 - q, \end{cases} \quad (71)$$

where 0<q<1 is the probability of corruption, σ≥0 is the noise level and $v_{ij}, \epsilon_{ij}$ are independently drawn from a uniform distribution on $S^2$. The UC model of assumes instead that $\epsilon_{ij}$ are i.i.d. $N(0,I_3)$.

Assume that $$\max_{ij\in E} \frac{|B_{ij}|}{|G_{ij}|} < \frac{1}{4},$$

the noise level of each edge follows i.i.d. subgaussian distribution sub(σ²). For $s^t$, by taking $\tau_0 <$ $$\min\left\{\frac{1}{2M}, \frac{1 - 4\max_{ij\in E}\frac{|B_{ij}|}{|G_{ij}|}}{(4e+1)\left(\mu + \sqrt{\frac{\pi}{2}}\right)\sigma}\right\} \text{ and}$$

$$\tau_t < \tau_{t+1} < \frac{1}{4} \frac{1 - \left(\mu + \sqrt{\frac{\pi}{2}}\right)\sigma\tau_t}{e\left(\mu + \sqrt{\frac{\pi}{2}}\right)\sigma\tau_t + \max_{ij\in E}\frac{|B_{ij}|}{|G_{ij}|}},$$

then the following holds for all t≥0

$$\|s^{(t)} - s^*\|_\infty < \frac{(4e+1)\left(\mu + \sqrt{\frac{\pi}{2}}\right)}{2 - 8\max_{ij\in E}\frac{|B_{ij}|}{|G_{ij}|}} \sigma \quad (72)$$

Assuming a subgaussian $\alpha_k$ (that is, $\alpha_k = \sigma X$) where $$Pr(X - \mu > t) < e^{-\frac{t^2}{2}}.$$

Let $Y = e^{-\tau_t \alpha_k}$ $$\mathbb{E}(Y) = \int_0^1 (1 - F_Y(y)) dy \quad (73)$$

$$= 1 - \int_0^1 Pr(e^{-\tau_t \sigma X} < y) dy \quad (74)$$

$$= 1 - \int_0^1 Pr\left(X > -\frac{1}{\sigma\tau_t}\log y\right) dy \quad (75)$$

$$> 1 - \int_0^{e^{-\mu\sigma\tau_t}} e^{-\left(\frac{1}{\sigma\tau_t}\log y + \mu\right)^2/2} dy - \int_{e^{-\mu\sigma\tau_t}}^1 1 dy \quad (76)$$

By letting $$x = \frac{1}{\sigma\tau_t}\log y + \mu,$$

$$\mathbb{E}(Y) > e^{-\mu\sigma\tau_t} - \int_{-\infty}^0 e^{-x^2/2} e^{\sigma\tau_t(x-\mu)} \sigma\tau_t dx \quad (77)$$

$$= e^{-\mu\sigma\tau_t} - \sigma\tau_t e^{-\sigma\tau_t\mu + \sigma^2\tau_t^2/2} \int_{-\infty}^0 e^{-\frac{(x-\sigma\tau_t)^2}{2}} dx \quad (78)$$

$$= e^{-\mu\sigma\tau_t} - \sqrt{2\pi}\,\sigma\tau_t e^{-\sigma\tau_t\mu + \sigma^2\tau_t^2/2} \Phi(-\sigma\tau_t) \quad (79)$$

$$\geq 1 - \left(\mu + \sqrt{\frac{\pi}{2}}\right)\sigma\tau_t \quad (80)$$

Let $Z = \alpha_k e^{-\tau_t \alpha_k}$ $$\mathbb{E}(Z) = \int_0^1 (1 - F_Z(z)) dz \quad (81)$$

$$= \int_0^{\frac{1}{e\tau_t}} Pr(\sigma X e^{-\tau_t \sigma X} > z) dz \quad (82)$$

$$< \int_0^{\frac{1}{e\tau_t}} Pr\left(X - \mu > \frac{z - \sigma\mu}{\sigma}\right) dz \quad (83)$$

For $$\mu\sigma > \frac{1}{e\tau_t},$$

$$\mathbb{E}(Z) < \frac{1}{e\tau_t}. \quad (84)$$

Otherwise, $$\mathbb{E}(Z) < \sigma\mu + \int_{\mu\sigma}^{\frac{1}{e\tau_t}} e^{-\frac{(z-\sigma\mu)^2}{2\sigma^2}} dz \quad (85)$$

-continued $$< \sigma\mu + \sigma\sqrt{2\pi}\left(\Phi\left(\frac{1}{e\sigma\tau_t} - \mu\right) - \Phi(0)\right) \quad (86)$$

Thus, $$\mathbb{E}(Z) < \min\left\{\mu\sigma, \frac{1}{e\tau_t}\right\} + \sqrt{2\pi}\,\sigma\left(\Phi\left(\max\left\{\frac{1}{e\sigma\tau_t} - \mu, 0\right\}\right) - \Phi(0)\right) \quad (87)$$

$$< \min\left\{\mu\sigma, \frac{1}{e\tau_t}\right\} + \max\left\{\min\left\{\frac{1}{e\tau_t} - \mu\sigma, \sqrt{\frac{\pi}{2}}\,\sigma\right\}, 0\right\} \quad (88)$$

$$< \min\left\{\frac{1}{e\tau_t}, \left(\mu + \sqrt{\frac{\pi}{2}}\right)\sigma\right\} \quad (89)$$

$$|s_{ij}^{(t+1)} - s_{ij}^*| \leq \frac{2e^{2\tau_t\|s^{(t)}-s^*\|_\infty}\left(\sum_{k\in G_{ij}}e^{-\tau_t a_k^*}a_k^* + \sum_{k\in B_{ij}}e^{-\tau_t a_k^*}a_k^*\right)}{\sum_{k\in G_{ij}}e^{-\tau_t a_k^*}} \quad (90)$$

$$\leq 2e^{2\tau_t\|s^{(t)}-s^*\|_\infty}\frac{1}{\tau_t}\frac{\min\left\{e^{-1}, \left(\mu + \sqrt{\frac{\pi}{2}}\right)\sigma\tau_t\right\} + \frac{|B_{ij}|}{|G_{ij}|}e^{-1}}{1 - \left(\mu + \sqrt{\frac{\pi}{2}}\right)\sigma\tau_t} \quad (91)$$

By taking maximum over $ij \in E$, $$\|s^{(t+1)} - s^*\|_\infty \leq 2e^{2\tau_t\|s^{(t)}-s^*\|_\infty}\frac{1}{\tau_t}\frac{\left(\mu + \sqrt{\frac{\pi}{2}}\right)\sigma\tau_t + \max_{ij\in E}\frac{|B_{ij}|}{|G_{ij}|}e^{-1}}{1 - \left(\mu + \sqrt{\frac{\pi}{2}}\right)\sigma\tau_t} \quad (92)$$

Assuming that $$\tau_t\|s^{(t)} - s^*\|_\infty < \frac{1}{2},$$

then $$\tau_{t+1}\|s^{(t+1)} - s^*\|_\infty < \frac{1}{2}$$

still holds. That is, $$\tau_{t+1}\|s^{(t+1)} - s^*\|_\infty \leq 2e\frac{\tau_{t+1}}{\tau_t}\frac{\left(\mu + \sqrt{\frac{\pi}{2}}\right)\sigma\tau_t + \max_{ij\in E}\frac{|B_{ij}|}{|G_{ij}|}e^{-1}}{1 - \left(\mu + \sqrt{\frac{\pi}{2}}\right)\sigma\tau_t} \leq \frac{1}{2}. \quad (93)$$

To make it possible, $$(4e+1)\left(\mu + \sqrt{\frac{\pi}{2}}\right)\sigma\tau_t < 1 - 4\max_{ij\in E}\frac{|B_{ij}|}{|G_{ij}|}. \quad (94)$$

By induction, for all $$t \geq 1, \|s^{(t)} - s^*\|_\infty < \frac{1}{2\tau_t} = \frac{(4e+1)\left(\mu + \sqrt{\frac{\pi}{2}}\right)}{2 - 8\max_{ij\in E}\frac{|B_{ij}|}{|G_{ij}|}}\sigma.$$

This completes the proof.

Assume that $d_{ij} \in [0, M]^{|C_{ij}|}$, and $$\max_{ij\in E}\frac{|B_{ij}|}{|G_{ij}|} < \frac{c_2}{3\pi},$$

the noise level of each edge follows i.i.d. half normal distribution $HN(0,\sigma)$. For $s^t$, by taking $$\tau_0 < \min\left\{\frac{1}{2M}, \frac{-c + \sqrt{c^2 + Kc_2/e - 12K^2}}{2K\sigma}\right\}$$

and $$\tau_t < \tau_{t+1} < \frac{c_2}{4e}\frac{1}{c\sigma\tau_1 + K(\sigma^2\tau_t^2 + 3)}\tau_t,$$

then the following holds for all $t \geq 0$ $$\|s^{(t)} - s^*\|_\infty < \frac{1}{2\tau_t} = \frac{K\sigma}{-c + \sqrt{c^2 + Kc_2/e - 12K^2}} \quad (95)$$

Proof: For simplicity, denote $\max\{s_{ik}^*, s_{jk}^*\}$ by $\alpha_k^*$.

$$|s_{ij}^{(t+1)} - s_{ij}^*| \leq \frac{2e^{2\tau_t\|s^{(t)}-s^*\|_\infty}\sum_{k\in C_{ij}}e^{-\tau_t a_k^*}a_k^*}{\sum_{k\in G_{ij}}e^{-\tau_t a_k^*}}. \quad (96)$$

For $s_{ij}^*$ i.i.d. following truncated normal distribution on $[0, M]$, whose mean and variance before truncation are 0 and $\sigma^2$ respectively, $s_{ij}^*$ may be viewed as a half-normal random variable X conditioned on $X \leq M$. Thus, $\alpha_k^*$ can be viewed as random variable $Z = \max\{X, Y\}$ conditioned on $Z \leq M$ where X and Y are i.i.d. half normal variables $HN(0,\sigma)$. In the mean time, $X = \sigma X_0$, $Y = \sigma Y_0$ and $Z_0 = \max\{X_0, Y_0\}$, where $X_0, Y_0 \sim HN(0,1)$. By definition, $Z = \sigma Z_0$.

Next, $$\lim_{|G_{ij}|\to\infty} \frac{\sum_{k\in G_{ij}} e^{-\tau_t a_k^*} a_k^*}{\sum_{k\in G_{ij}} e^{-\tau_t a_k^*}} = \frac{\mathbb{E}(e^{-\tau_t Z} Z \mid Z \le M)}{\mathbb{E}(e^{-\tau_t Z} \mid Z \le M)} \quad (97)$$

$$\le \frac{\mathbb{E}(e^{-\tau_t Z} Z \mid Z \le M)\mathbb{P}(Z \le M) +}{\mathbb{E}(e^{-\tau_t Z} Z \mid Z > M)\mathbb{P}(Z > M)} \quad (98)$$
$$\phantom{\le} \frac{}{\mathbb{E}(e^{-\tau_t Z} \mid Z \le M)\mathbb{P}(Z \le M) +}$$
$$\phantom{\le} \frac{}{\mathbb{E}(e^{-\tau_t Z} \mid Z > M)\mathbb{P}(Z > M)}$$

$$= \frac{\mathbb{E}(e^{-\tau_t Z} Z)}{\mathbb{E}(e^{-\tau_t Z})} \quad (99)$$

where the inequality follows from the fact that $\mathbb{E}(e^{-\tau_t Z}Z \mid Z\le M)/\mathbb{E}(e^{-\tau_t Z}\mid Z\le M) \le M$ while $\mathbb{E}(e^{-\tau_t Z}Z\mid Z>M)/\mathbb{E}(e^{-\tau_t Z}\mid Z>M) > M$. In the following, an upper and lower bound for the numerator and denominator are found, respectively.

$$\mathbb{E}(e^{-\tau_t Z} Z) = \int_0^\infty e^{-\tau_t x} x d\left(\sqrt{\frac{2}{\pi\sigma^2}} \int_0^x e^{-\frac{t^2}{2\sigma^2}} dt\right)^2 \quad (100)$$

$$= \frac{4}{\pi\sigma^2} \int_0^\infty e^{-\tau_t x} x \left(\int_0^x e^{-\frac{t^2}{2\sigma^2}} dt\right) e^{-\frac{x^2}{2\sigma^2}} dx \quad (101)$$

$$\le \sqrt{\frac{8}{\pi\sigma^2}} \int_0^\infty e^{-\tau_t x} x \min\left\{\sqrt{\frac{2}{\pi}} \frac{x}{\sigma}, 1\right\} e^{-\frac{x^2}{2\sigma^2}} dx \quad (102)$$

$$= \sqrt{\frac{8}{\pi\sigma^2}} \int_0^{\sqrt{\frac{\pi}{2}}\sigma} \sqrt{\frac{2}{\pi}} \frac{1}{\sigma} x^2 e^{-\tau_t x} e^{-\frac{x^2}{2\sigma^2}} dx + \quad (103)$$
$$\sqrt{\frac{8}{\pi\sigma^2}} \int_{\sqrt{\frac{\pi}{2}}\sigma}^\infty x e^{-\tau_t x} e^{-\frac{x^2}{2\sigma^2}} dx$$

$$= I_1 + I_2 \quad (104)$$

By letting $$z = \frac{x}{\sigma} + \tau_t \sigma,$$

$$I_1 = \frac{4}{\pi\sigma^2} \int_0^{\sqrt{\frac{\pi}{2}}\sigma} x^2 e^{-\tau_t x} e^{-\frac{x^2}{2\sigma^2}} dx \quad (105)$$

$$= \frac{4}{\pi} \sigma e^{\frac{\sigma^2 \tau_t^2}{2}} \int_{\sigma\tau_t}^{\sigma\tau_t + \sqrt{\frac{\pi}{2}}} (z - \sigma\tau_t)^2 e^{-\frac{1}{2}z^2} dz \quad (106)$$

$$= \frac{4}{\pi} \sigma e^{\frac{\sigma^2 \tau_t^2}{2}} \left(-z e^{-\frac{1}{2}z^2} \lg\Big|_{\sigma\tau_t}^{\sigma\tau_t+\sqrt{\frac{\pi}{2}}} + \int_{\sigma\tau_t}^{\sigma\tau_t+\sqrt{\frac{\pi}{2}}} e^{-\frac{1}{2}z^2} dz \right. \quad (107)$$

$$\left. + 2\sigma\tau_t e^{-\frac{1}{2}z^2} \lg\Big|_{\sigma\tau_t}^{\sigma\tau_t+\sqrt{\frac{\pi}{2}}} + \sigma^2\tau_t^2 \int_{\sigma\tau_t}^{\sigma\tau_t+\sqrt{\frac{\pi}{2}}} e^{-\frac{1}{2}z^2} dz\right) \quad (108)$$

$$\le \frac{4}{\pi} \sigma \left(-\sigma\tau_t + \left(\sigma\tau_t - \sqrt{\frac{\pi}{2}}\right) e^{-\frac{\pi}{4} - \sqrt{\frac{\pi}{2}} \sigma\tau_t} + \right. \quad (109)$$
$$\left. (1 + \sigma^2\tau_t^2) e^{\frac{\sigma^2 \tau_t^2}{2}} \int_{\sigma\tau_t}^{\sigma\tau_t + \sqrt{\frac{\pi}{2}}} e^{-\frac{1}{2}z^2} dz\right)$$

By letting $$z = \frac{x}{\sigma} + \tau_t \sigma$$

$$I_2 = \sqrt{\frac{8}{\pi}} \sigma e^{\frac{\sigma^2 \tau_t^2}{2}} \int_{\sigma\tau_t + \sqrt{\frac{\pi}{2}}}^\infty (z - \sigma\tau_t) e^{-\frac{1}{2}z^2} dz \quad (110)$$

$$= \sqrt{\frac{8}{\pi}} \sigma e^{\frac{\sigma^2 \tau_t^2}{2}} \left(-e^{-\frac{1}{2}z^2}\lg\Big|_{\sigma\tau_t+\sqrt{\frac{\pi}{2}}}^\infty - \sigma\tau_t \int_{\sigma\tau_t+\sqrt{\frac{\pi}{2}}}^\infty e^{-\frac{1}{2}z^2} dz\right) \quad (111)$$

$$\le \sqrt{\frac{8}{\pi}} \sigma \left(e^{-\frac{\pi}{4} - \sqrt{\frac{\pi}{2}}\sigma\tau_t} - \sigma\tau_t e^{\frac{\sigma^2\tau_t^2}{2}} \int_{\sigma\tau_t+\sqrt{\frac{\pi}{2}}}^\infty e^{-\frac{1}{2}z^2} dz\right) \quad (112)$$

Thus, $$\mathbb{E}(e^{-\tau_t Z} Z) \le \frac{4}{\pi}\sigma\left(-\sigma\tau_t + (1+\sigma^2\tau_t^2) e^{\frac{\sigma^2\tau_t^2}{2}} \int_{\sigma\tau_t}^{\sigma\tau_t+\sqrt{\frac{\pi}{2}}} e^{-\frac{1}{2}z^2} dz \right. \quad (113)$$

$$\left. + e^{-\frac{\pi}{4}-\sqrt{\frac{\pi}{2}}\sigma\tau_t}\sigma\tau_t - \sqrt{\frac{\pi}{2}}\sigma\tau_t e^{\frac{\sigma^2\tau_t^2}{2}} \int_{\sigma\tau_t+\sqrt{\frac{\pi}{2}}}^\infty e^{-\frac{1}{2}z^2} dz\right) \quad (114)$$

Let $$c_1 = \sqrt{\frac{2}{\pi}}\, c_2$$

where $$c_2 = \Phi\left(\sqrt{\frac{\pi}{2}}\right) - \Phi\left(-\sqrt{\frac{\pi}{2}}\right) \approx 0.79.$$

$$\mathbb{E}(e^{-\tau_t Z}) = \int_0^\infty e^{-\tau_t x} d\left(\sqrt{\frac{2}{\pi\sigma^2}}\int_0^x e^{-\frac{t^2}{2\sigma^2}} dt\right)^2 \quad (115)$$

$$= \sqrt{\frac{8}{\pi\sigma^2}} \int_0^\infty e^{-\tau_t x} \sqrt{\frac{2}{\pi\sigma^2}} \int_0^x e^{-\frac{t^2}{2\sigma^2}} dt\, e^{-\frac{x^2}{2\sigma^2}} dx \quad (116)$$

$$\ge \sqrt{\frac{8}{\pi\sigma^2}} \int_0^\infty \min\left\{c_1 \frac{x}{\sigma}, c_2\right\} e^{-\tau_t x} e^{-\frac{x^2}{2\sigma^2}} dx \quad (117)$$

-continued $$= \sqrt{\frac{8}{\pi\sigma^2}} c_2 \int_0^{\sqrt{\frac{\pi}{2}}\sigma} \sqrt{\frac{2}{\pi}} \frac{x}{\sigma} e^{-\tau_t x} e^{-\frac{x^2}{2\sigma^2}} dx + \sqrt{\frac{8}{\pi\sigma^2}} c_2 \int_{\sqrt{\frac{\pi}{2}}\sigma}^{\infty} e^{-\tau_t x} e^{-\frac{x^2}{2\sigma^2}} dx \quad (118)$$

By letting $$z = \frac{x}{\sigma} + \tau_t \sigma$$

$$\mathbb{E}(e^{-\tau_t Z}) \geq \frac{4}{\pi} c_2 \left(1 - e^{-\frac{\pi}{4} - \sqrt{\frac{\pi}{2}}\sigma\tau_t}\right) - \frac{4}{\pi} c_2 e^{\frac{\sigma^2 \tau_t^2}{2}} \sigma\tau_t \int_{\sigma\tau_t}^{\sigma\tau_t + \sqrt{\frac{\pi}{2}}} e^{-\frac{1}{2}z^2} dz \quad (119)$$

$$+ \sqrt{\frac{8}{\pi}} c_2 e^{\frac{\sigma^2 \tau_t^2}{2}} \int_{\sigma\tau_t + \sqrt{\frac{\pi}{2}}}^{\infty} e^{-\frac{1}{2}z^2} dz \quad (120)$$

$$\geq \frac{4}{\pi} c_2 \left(1 - e^{-\frac{\pi}{4} - \sqrt{\frac{\pi}{2}}\sigma\tau_t} - \sigma\tau_t e^{\frac{\sigma^2 \tau_t^2}{2}} \int_{\sigma\tau_t}^{\sigma\tau_t + \sqrt{\frac{\pi}{2}}} e^{-\frac{1}{2}z^2} dz + \sqrt{\frac{\pi}{2}} e^{\frac{\sigma^2 \tau_t^2}{2}} \int_{\sigma\tau_t + \sqrt{\frac{\pi}{2}}}^{\infty} e^{-\frac{1}{2}z^2} dz\right) \quad (121)$$

Thus, $$\frac{\mathbb{E}(e^{-\tau_t Z} Z)}{\mathbb{E}(e^{-\tau_t Z})} \leq \quad (122)$$

$$\frac{\sigma}{c_2} \cdot \frac{-\sigma\tau_t + (1 + \sigma^2 \tau_t^2) e^{\frac{\sigma^2 \tau_t^2}{2}} \int_{\sigma\tau_t}^{\sigma\tau_t + \sqrt{\frac{\pi}{2}}} e^{-\frac{1}{2}z^2} dz + e^{-\frac{\pi}{4} - \sqrt{\frac{\pi}{2}}\sigma\tau_t} \sigma\tau_t - \sqrt{\frac{\pi}{2}} \sigma\tau_t e^{\frac{\sigma^2 \tau_t^2}{2}} \int_{\sigma\tau_t + \sqrt{\frac{\pi}{2}}}^{\infty} e^{-\frac{1}{2}z^2} dz}{1 - e^{-\frac{\pi}{4} - \sqrt{\frac{\pi}{2}}\sigma\tau_t} - \sigma\tau_t e^{\frac{\sigma^2 \tau_t^2}{2}} \int_{\sigma\tau_t}^{\sigma\tau_t + \sqrt{\frac{\pi}{2}}} e^{-\frac{1}{2}z^2} dz + \sqrt{\frac{\pi}{2}} e^{\frac{\sigma^2 \tau_t^2}{2}} \int_{\sigma\tau_t + \sqrt{\frac{\pi}{2}}}^{\infty} e^{-\frac{1}{2}z^2} dz} \quad (123)$$

$$\leq \frac{1}{c_2} \min\left\{c\sigma, \frac{2}{\tau_t}\right\} \quad (124)$$

where $$c = \frac{\int_0^{\sqrt{\frac{\pi}{2}}} e^{-\frac{1}{2}z^2} dz}{1 - e^{-\frac{\pi}{4}} + \sqrt{\frac{\pi}{2}} \int_{\sqrt{\frac{\pi}{2}}}^{\infty} e^{-\frac{1}{2}z^2} dz} \approx 1.133.$$

$$\lim_{|G_{ij}| \to \infty} \frac{\sum_{k \in B_{ij}} e^{-\tau_t a_k^*} a_k^*}{\sum_{k \in G_{ij}} e^{-\tau_t a_k^*}} \leq \frac{|B_{ij}|}{|G_{ij}|} \cdot \frac{1}{e\tau_t \mathbb{E}(e^{-\tau_t Z})} \quad (125)$$

$$\leq \frac{\pi}{4c_2} \frac{|B_{ij}|}{|G_{ij}|} \frac{1}{e\tau_t} (\sigma^2 \tau_t^2 + 3) \quad (126)$$

$$= \frac{\pi}{4c_2 e} \frac{|B_{ij}|}{|G_{ij}|} \sigma\left(\sigma\tau_t + \frac{3}{\sigma\tau_t}\right) \quad (127)$$

Thus $$|s_{ij}^{(t+1)} - s_{ij}^*| \leq \frac{2e^{2\tau_t \|s^{(t)} - s^*\|_\infty} \left(\sum_{k \in G_{ij}} e^{-\tau_t a_k^*} a_k^* + \sum_{k \in B_{ij}} e^{-\tau_t a_k^*} a_k^*\right)}{\sum_{k \in G_{ij}} e^{-\tau_t a_k^*}} \quad (128)$$

$$\leq \frac{2}{c_2} e^{2\tau_t \|s^{(t)} - s^*\|_\infty} \left(\min\left\{c\sigma, \frac{2}{\tau_t}\right\} + \frac{\pi}{4e} \frac{|B_{ij}|}{|G_{ij}|} \sigma\left(\sigma\tau_t + \frac{3}{\sigma\tau_t}\right)\right) \quad (129)$$

where $$K = \frac{\pi}{4e} \max_{ij \in E} \frac{|B_{ij}|}{|G_{ij}|}.$$

Thus, $$\|s^{(t+1)} - s^*\|_\infty \leq \frac{2}{c_2} e^{2\tau_t \|s^{(t)} - s^*\|_\infty} \frac{1}{\tau_t} (c\sigma\tau_t + K(\sigma^2 \tau_t^2 + 3)). \quad (130)$$

By the assumptions $$K < c_2/(12e), \quad \tau_t \|s^{(t)} - s^*\|_\infty < \frac{1}{2},$$

$$\tau_t < \frac{-c + \sqrt{c^2 + Kc_2/e - 12K^2}}{2K\sigma}, \quad \frac{c_2}{4e} \frac{1}{c\sigma\tau_t + K(\sigma^2 \tau_t^2 + 3)} > 1$$

and thus $$\tau_t < \tau_{t+1} < \frac{c_2}{4e} \frac{1}{c\sigma\tau_t + K(\sigma^2 \tau_t^2 + 3)} \tau_t.$$

As a result, $$\tau_{t+1} \|s^{(t+1)} - s^*\|_\infty = \frac{2e}{c} \frac{\tau_{t+1}}{\tau_t} (c\sigma\tau_t + K(\sigma^2 \tau_t^2 + 3)) < \frac{2e}{c} \frac{c_2}{4e} = \frac{1}{2}. \quad (113)$$

By induction, an increasing sequence $\{\tau_t\}$ is constructed such that $$\tau_t \|s^{(t)} - s^*\|_\infty < \frac{1}{2}.$$

However, $\tau_t$ may not increase to $\infty$, since the largest possible $\tau_t$ is strictly upper bounded by $$\tau_t < \frac{-c + \sqrt{c^2 + Kc_2/e - 12K^2}}{2K\sigma}. \quad (132)$$

As a result, for $$\max_{ij \in E} \frac{|B_{ij}|}{|G_{ij}|} < \frac{c_2}{3\pi}$$

and t>0

$$\|s^{(t)} - s^*\|_\infty < \frac{1}{2\tau_t} = \frac{K\sigma}{-c + \sqrt{c^2 + Kc_2/e - 12K^2}} \quad (133)$$

In the case of $\mathbb{Z}_2$ sychronization, consider the $g_{ij}^*$ and $\tilde{g}_{ij} \in \{-1,1\}$. The group multiplication is exactly the arithmetic multiplication, and thus $d_{ij}=|g_{ij}g_{ik}g_{ki}-1|$. Recall that for the $\mathbb{Z}_2$ sychronization, $d_{ij} \in \{0,2\}$. With this stronger assumption, a much stronger theoretical result is obtained.

If $\min_{ij \in E} g_{ij} > (\sqrt{5}-1)/2$, then there exists a decreasing sequence $\{\tau_t\}_{t \geq 1}$ such that $S_{ij}^t$ linearly converges to $S_{ij}^*$ for $ij \in E$.

Let G(V,E) be any C-well-distributed graph. If $\min_{ij \in E} g_{ij} > 1-c$ and $e_{ij} \sim U([0,\pi])$, then there exists a decreasing sequence $\{\tau_t\}_{t \geq 1}$ such that $S_{ij}^t$ linearly converges to $S_{ij}^*$ for $ij \in E$.

A statistic may distinguish corrupted edges. It uses the geometric notion of cycle-consistency of uncorrupted edges. Cycle-consistency measures were used in as criteria for outlier removal. For location recovery, the cycle-consistency of 3 vectors $\gamma_1, \gamma_2, \gamma_3 \in S^2$ refers to the existence of $\lambda_1, \lambda_2, \lambda_3 > 0$ such that $$\lambda_1 \gamma_1 + \lambda_2 \gamma_2 + \lambda_3 \gamma_3 = 0. \quad (134)$$

One may easily observe that the pairwise directions $\gamma_{ij}^*$, $\gamma_{jk}^*, \gamma_{ki}^*$ are cycle-consistent by substituting in (134)) $\lambda_{ij}=\|t_i^*-t_j^*\|$, $\lambda_{jk}=\|t_j^*-t_k^*\|$ and $\Delta_{ki}=\|t_k^*-t_i^*\|$. However, if any of the three vectors is randomly corrupted, the consistency constraint is most probably violated. Thus, a certain cycle-inconsistency measure that indicates the underlying corruption level is described.

A basic measure of inconsistency of a given pairwise direction is shown with respect to 2 other pairwise directions, where the 3 directions result from 3 unknown locations. It is referred to as the AAB inconsistency. These inconsistencies may be used to define the naive AAB statistic of a given pairwise direction that is used to remove corrupted edges. The iteratively reweighted AAB (IR-AAB) statistic aims to further improve the accuracy of naive AAB in removing corrupted edges.

Define the cycle-consistency region of $\gamma_1, \gamma_2 \in S^2$ as $\Omega(\gamma_1, \gamma_2) = \{\gamma \in S^2: \gamma_1, \gamma_2, \gamma \text{ are cycle-consistent}\}$. $d_g$ denotes the great-circle distance, i.e., the length of the shortest path on $S^2$. The AAB inconsistency of $\gamma_3 \in S^2$ with respect to $\gamma_1$ and $\gamma_2$ is defined by $$I_{AAB}(\gamma_3; \gamma_1, \gamma_2) = d_g(\gamma_3, \Omega(\gamma_1, \gamma_2)) = \min_{\gamma \in \Omega(\gamma_1, \gamma_2)} d_g(\gamma_3, \gamma). \quad (135)$$

The following formula for computing the AAB inconsistency is crucial for efficient implementation of the algorithms described below. For $\gamma_1, \gamma_2, \gamma_3 \in S^2$, $X=\gamma_1^T\gamma_3$, $y=\gamma_2^T\gamma_3$, $z=\gamma_1^T\gamma_2$ and $\alpha = I(x<yz) \cdot I(y<xz)$, where I is the indicator function, $$I_{AAB}(\gamma_3; \gamma_1, \gamma_2) = \cos^{-1}\left(a \cdot \frac{x^2 + y^2 - 2xyz}{1-z^2} + (a-1)\min(x,y)\right). \quad (136)$$

Initially define the naive AAB statistic of an edge $ij \in E$ as the average of the AAB inconsistencies $I_{AAB}(\gamma_{ij}; \gamma_{jk}, \gamma_{ki})$ over the set $C_{ij} = \{k \in [n]: ik \in E \text{ and } jk \in E\}$. That is, $$S_{AAB}^{initial}(ij) = \frac{1}{|C_{ij}|} \sum_{k \in C_{ij}} I_{AAB}(\gamma_{ij}; \gamma_{jk}, \gamma_{ki}). \quad (137)$$

This may be used as an indication for the corruption level of $\gamma_{ij}$ and thus remove the edges with largest AAB statistics. Note that the AAB formula in (136) enables computation of the naive AAB statistic through vectorization instead of using a loop, and thus allows efficient coding in programming languages with an effective linear algebra toolbox. However, the average over $C_{ij}$ can be costly. Thus, the system may use a small random sample from $C_{ij}$ of size s, where the default value of S is 50.

Initially, the IR-AAB procedure computes the naive AAB statistic. The reweighting strategy of IR-AAB tries to reduce the weights of $I_{AAB}(Y_{ij}; \gamma_{jk}, \gamma_{ki})$ when either ki or kj are highly corrupted. In order to do this, at each iteration the AAB inconsistencies $I_{AAB}(\gamma_{ij}; \gamma_{jk}, \gamma_{ki})$ involving suspicious edges are penalized by the reweighting function $\exp(-\tau^{(t)} x)$. The number X is the maximal value of the reweighted AAB statistics computed in previous iteration for edges ik and kj. The parameter $\tau^{(t)}$ increases iteratively and depends on the initial maximal and minimal values of inconsistencies, denoted by M and m.

The use of slowly-decreasing reweighting functions in the first iterations ensures that only the most unreliable AAB inconsistencies are ignored. As the data is iteratively purified, the AAB inconsistencies involving "good" edges are weighted more and more. Increasing $\tau^{(t)}$ corresponds to focusing more on "good" edges and ignoring more "suspicious" edges.

Note that IR-AAB alternatively updates the weights using the AAB statistics and then updates the AAB statistics using the new weights. This way better weights can reduce the effect of highly corrupted edges so that the updated AAB statistics measures more accurately the corruption level of edges. Similarly, better estimates of the corruption level by the AAB statistics provide more accurate weights, which emphasize the more relevant edges. In the special practical case of repetitive patterns (e.g., due to identical windows), this procedure can help in identifying corrupted edges that are self-consistent with each other.

The failure mode for any AAB procedure is when there are no outliers, so the task of identifying corruptions is ill-posed. This can also happen when the noise magnitude is enormous and outliers are not distinguishable.

As mentioned earlier, implementations for naive AAB and IR-AAB may avoid loops and use instead vectorization due to the AAB formula. An efficient Matlab code will be provided in the future supplemental webpage. For naive AAB and IR-AAB, s=50 may be used as default. For IR-AAB, the default value T=10 may be used.

The computational complexity of naive AAB is $O(s \cdot |E|)$, where $|E|$ is the number of edges. In general, for dense graphs the complexity is $O(s \cdot n^2)$, but for sparser graphs the complexity decreases, e.g., for sparse Erdös-Rényi graphs with $p \ll 1$, the complexity is $O_P(s \cdot p \cdot n^2)$ since $\mathbb{E}[|E|] = n(n-1)p/2$. The computational complexity of IR-AAB is also $O(s \cdot |E|)$. While IR-AAB is iterated T=10 times, its main computation is due to the initial application of naive AAB, which requires the computation of the AAB inconsistencies. On the other hand the weight computations in the subsequent iterations is much cheaper. Therefore in practice, the computational complexity of naive AAB and IR-AAB are truly comparable.

The naive AAB statistic can be used for near-perfect separation of corrupted and uncorrupted edges. Given pairwise directions generated on an edge set E by the uniform corruption model, $E_g$ denotes the uncorrupted edges, namely, all edges $ij \in E$ such that $\gamma_{ij} = \gamma_{ij}^*$. The rest of edges in E are denoted by $E_b$. The theorem below states that under the uniform corruption model with sufficiently small corruption probability and noise level, the naive AAB statistic is able to perfectly separate $E_g$ as well as a large portion of $E_b$.

There exist absolute positive constants $C_0$, C such that for any $\mathcal{E} \in [0,1]$ and for pairwise directions randomly generated by the uniform corruption model $UC(n, p, q, \sigma)$ with $n = \Omega/(1/pq\in)$, $np^2(1-q)^2 \geq C_0 \log n$ and $q + \sigma < C\mathcal{E}/\sqrt{\log n}$, there exists a set $E' \subseteq E_b$ such that $|E'| \geq (1-\mathcal{E})|E_b|$ and with probability $1 - 0(n^{-5})$, $$\min_{ij \in E'} \mathbb{E}[S_{AAB}^{(0)}(ij)] > \max_{ij \in E_g} \mathbb{E}[S_{AAB}^{(0)}(ij)]. \tag{138}$$

The theorem can be extended to other synthetic models. For instance, the assumption in the UC model that the locations are sampled from a Gaussian distribution can be generalized to any distribution that generates "c-well-distributed locations." One can show that a compactly supported distribution with continuous and positive density satisfies this criterion with an absolute constant C (unlike the Gaussian case) and consequently the theorem may have the weaker assumption: $q + \sigma < C\mathcal{E}$. The uniform noise assumption in the UC model can be directly extended to any compactly supported distribution. For Gaussian noise, the theorem may be slightly modified such that the RHS of (138) is maximized over a sufficiently large subset of $E_g$ (similarly to the LHS w.r.t. $E_b$).

The main proof of this concept starts with stating two essential bounds: An upper bound on the expectation of $S_{AAB}^{(0)}(ij)$ when $ij \in E_g$ and a lower probabilistic bound on the expectation of $S_{AAB}^{(0)}(ij)$ when $ij \in E_b$. The upper bound is stated in (140). The lower bound is stated in (141). While the upper bound is uniform over $ij \in E_g$, the lower bound depends on the corruption level of each edge $ij \in E_b$. However, there is an absolute bound which holds within a large subset of $E_b$. The uniform upper bound is lower than the absolute lower bound and thus the expected values of $S_{AAB}^{(0)}(ij)$ when $ij \in E_g$ are separated from the expected values of $S_{AAB}^{(0)}(ij)$ when ij is in a large subset of $E_b$.

Some properties of the AAB inconsistency include:
(i) $I_{AAB}(\gamma_3; \gamma_1, \gamma_2) \in [0, \pi]$ $\forall \gamma_1, \gamma_2, \gamma_3 \in S^2$.
(ii) $I_{AAB}(\gamma_3; \gamma_1, \gamma_2) = 0$ iff $\gamma_1, \gamma_2, \gamma_3$ are cycle-consistent.
(iii) The AAB inconsistency is rotation-invariant. That is, for any rotation R:

$I_{AAB}(\gamma_3; \gamma_1, \gamma_2) = I_{AAB}(R\gamma_3; R\gamma_1, R\gamma_2)$.

$U(S^2)$ denotes the uniform distribution on $S^2$ and define $Z := I_{AAB}(z; X, y)$, where X, y, z i.i.d. $\sim U(S^2)$. For $x \in [0, \pi]$, let $f(x) := \mathbb{E}[I_{AAB}(v_2(x); v_1, v) | v \sim U(S^2)]$, where $v_1 = (1,0,0)^T$ and $v_2(x) = (\cos x, \sin x, 0)^T$.

If $x \in [0, \pi]$, then $$f(x) = \frac{1}{2}(x + \sin x).$$

Let $G = G(V, E)$ be a graph with vertices $V = \{t_i\}_{i=1}^n \subseteq \mathbb{R}^3$. For $X, y \in \mathbb{R}^3$, $C > 0$ and $A \subseteq V$, A is C-well-distributed with respect to $(X, y)$ if the following holds for any $h \in \mathbb{R}^3$:

$$\frac{1}{|A|} \sum_{t \in A} \|P_{\text{span}\{t-X, t-y\}^\perp}(h)\| \geq c\hat{A} \cdot \|P_{(X-y)^\perp}(h)\|. \tag{139}$$

V is C-well-distributed along G if for all distinct $1 \leq i, j \leq n$, the set $S_{ij} = \{t_k \in V : ik, jk \in E(G)\}$ is C-well-distributed with respect to $(t_i, t_j)$.

Let $e_{ij} := \measuredangle(\gamma_{ij}, \gamma_{ij}^*)$ denote the corruption level of edge $ij \in E$. A first inequality holds for any fixed $ij \in E$:

$$\mathbb{E}[S_{AAB}^{(0)}(ij) | ij \in E_g] \leq \pi\sigma(1-q)_{2+\pi}q(1-q) + q^2 \mathbb{E}[Z]. \tag{140}$$

A second inequality holds with probability $1 - n^{-5}$ for all $ij \in E$:

$$\mathbb{E}[S_{AAB}^{(0)}(ij) | ij \in E_b] \geq \tag{141}$$

$$(1-q)^2 \left[ \frac{C'}{\sqrt{\log n}} \min(e_{ij}, \pi - e_{ij}) - \frac{\pi}{2}\sigma \right] + q^2 \mathbb{E}[Z].$$

Recall that there exists an absolute constant C such that $$q + \sigma < \frac{C\epsilon}{\sqrt{\log n}}. \tag{142}$$

Multiplying both sides of (142) by $3\pi(1-q)^2/2$, noting that for n sufficiently large $1 - q \geq 1 - C\epsilon/\sqrt{\log n} > 2/3$ and thus $3q(1-q)^2/2 > q(1-q)$ and setting $C' = 6C$ yield $$\pi \left[ q(1-q) + \frac{3}{2}\sigma(1-q)^2 \right] < (1-q)^2 \frac{C'}{\sqrt{\log n}} \cdot \frac{\pi\epsilon}{4}. \tag{143}$$

Clearly (143) can be rewritten as $$\pi\sigma(1-q)^2 + \pi q(1-q) < (1-q)^2 \left[ \frac{C'}{\sqrt{\log n}} \cdot \frac{\pi\epsilon}{4} - \frac{\pi}{2}\sigma \right]. \tag{144}$$

Combining (140), (141) and (144) results in $$\max_{ij \in E_g} \mathbb{E}[S_{AAB}^{(0)}(ij)] < \min_{\substack{ij \in E_b \\ \min(e_{ij}, \pi - e_{ij}) > \frac{\pi\epsilon}{4}}} \mathbb{E}[S_{AAB}^{(0)}(ij)]. \tag{145}$$

Let $E' = \{ij \in E_b: \min(e_{ij}, \pi - e_{ij}) > \pi \in /4\}$. Since $e_{ij}$ is i.i.d.~U$[0, \pi]$, $X_{ij}$ := $(ij \notin E')$ is a Bernoulli random variable with mean $\mu = \in /2$. Applying Chernoff bound yields $$Pr(\Sigma_{ij \in E_b} X_{ij} > 2|E_b|\mu) < \exp(-\Omega(|E_b|\mu)). \quad (146)$$

That is, with probability $1 - \exp(-\Omega(n^2 pq \in))$, $|E=| > (1-\in)|E_b|$. Since $n = \Omega(1/pq\in)$ this probability is sufficiently high. Thus, Theorem 6.1 is concluded if (140) and (141) are correct.

The distribution of $I_{AAB}(\gamma_{ij}; \gamma_{jk}, \gamma_{ki})$ for fixed $ij \in E_g$ and $k \in C_{ij}$ is demonstrated in the following 3 complementary cases:

Case 1. jk, ki $\in E_g$.

In this case, $\gamma_{ij} = \gamma_{ij}^* + v_{ij}, \gamma_{jk} = \gamma_{jk}^* + v_{jk}$ and $\gamma_{ki} = \gamma_{ki}^* + v_{ki}$, where $v_{ij} = (\gamma_{ij}^* + \sigma \in_{ij})/\|\gamma_{ij}^* + \sigma \in_{ij}\| - \gamma_{ij}^*$, $\in_{ij} \sim U(S^2)$ and $v_{jk}$ and $v_{ki}$ are defined in the same way. If $\sigma = 0$, then the AAB inconsistency is 0 in the current case. If $\sigma > 0$, then since $\|\in_{ij}\| = 1$ the AAB inconsistency is bounded as follows:

$$X_{ij}^{(g)}(k) := I_{AAB}(\gamma_{ij}; \gamma_{jk}, \gamma_{ki}) = \quad (147)$$

$$d_g(\gamma_{ij}^* + v_{ij}, \Omega(\gamma_{jk}^* + v_{jk}, \gamma_{ki}^* + v_{ki})) \leq d_g(\gamma_{ij}^* + v_{ij}, \gamma_{ij}^*) +$$

$$d_g(\gamma_{ij}^*, \Omega(\gamma_{jk}^* + v_{jk}, \gamma_{ki}^* + v_{ki})) \leq d_g(\gamma_{ij}^* + v_{ij}, \gamma_{ij}^*) +$$

$$d_g(\gamma_{ij}^*, \Omega(\gamma_{jk}^*, \gamma_{ki}^*)) + \max(d_g(\gamma_{jk}^*, \gamma_{jk}^* + v_{jk}),$$

$$d_g(\gamma_{ki}^*, \gamma_{ki}^* + v_{ki})) \leq \frac{\pi}{2}\sigma + 0 + \frac{\pi}{2}\sigma = \pi\sigma.$$

Case 2. Either $ji \in E_g$ or $ki \in E_g$, but not both in $E_g$.

Assume WLOG that $jk \in E_g$ and $ki \in E_b$. According to the uniform corruption model, $\gamma_{ki} \sim U(S^2)$, $\gamma_{jk} = \gamma_{jk}^* + v_{jk}$, $\gamma_{ij} = \gamma_{ij}^* + v_{ij}$. For any indices ijk, let $\theta_{ijk}$ denotes the angle between $\gamma_{ij}$ and $\gamma_{kj}$. By choosing appropriate rotation matrix R, $$Y_{ij}^g(k) := \quad (148)$$

$$I_{AAB}(\gamma_{ij}; \gamma_{jk}, \gamma_{ki}) = I_{AAB}(R\gamma_{ij}; R\gamma_{jk}, R\gamma_{ki}) = I_{AAB}(v_2(\theta_{ijk}); v_1, v),$$

where $v \sim U(S^2)$. The fact that $f(x) \in [0, \pi/2]$ for $x \in [0, \pi]$ imply the inequality $$\mathbb{E}[Y_{ij}^g(k)] = \mathbb{E}_{\theta_{ijk}}[f(\theta_{ijk})] \leq \frac{\pi}{2}. \quad (149)$$

Case 3. jk, ki $\in E_b$

Let $Z_{ij}^g(k)$ be defined as follows with distribution equivalent formulations that use an arbitrary rotation R and X, y~$(S^2)$:

$$Z_{ij}^g(k) := \quad (150)$$

$$I_{AAB}(\gamma_{ij}; \gamma_{jk}, \gamma_{ki}) \stackrel{d}{=} I_{AAB}(R\gamma_{ij}; R\gamma_{jk}, R\gamma_{ki}) \stackrel{d}{=} I_{AAB}(R\gamma_{ij}; X, y).$$

Since R is arbitrary, $Z_{ij}^g(k)$ is independent of $\gamma_{ij}$ and for $z \sim (S^2)$ $$Z_{ij}^g(k) := I_{AAB}(\gamma_{ij}; \gamma_{jk}, \gamma_{ki}) \stackrel{d}{=} I_{AAB}(z; X, y) = Z. \quad (151)$$

At last, combining (147), (149) and (151) with probabilities $(1-q)^2$, $2q(1-q)$ and $q^2$ for each case respectively yields (140).

The distribution of $I_{AAB}(\gamma_{ij}; \gamma_{ik}, \gamma_{ki})$ for fixed $ij \in E_b$ and $k \in C_{ij}$ is shown in the following 3 complementary cases:

Case 1. jk, ki $\in E_g$. Observe that $$I_{AAB}(\gamma_{ij}; \gamma_{jk}^*, \gamma_{ki}^*) = \min_{v \in \Omega(\gamma_{jk}^*, \gamma_{ki}^*)} d_g(\gamma_{ij}, v) \geq \min_{v \in \text{span}\{\gamma_{jk}^*, \gamma_{ki}^*\}} d_g(\gamma_{ij}, v) \geq \quad (152)$$

$$\min_{v \in \text{span}\{\gamma_{jk}^*, \gamma_{ki}^*\}} \|\gamma_{ij} - v\| = \left\|P_{\text{span}\{t_k^* - t_i^*, t_k^* - t_j^*\}^\perp}(\gamma_{ij})\right\| \text{ and}$$

$$X_{ij}^b(k) := I_{AAB}(\gamma_{ij}; \gamma_{jk}, \gamma_{ki}) = \quad (153)$$

$$d_g(\gamma_{ij}, \Omega(\gamma_{jk}^* + v_{jk}, \gamma_{ki}^* + v_{ki})) \geq d_g(\gamma_{ij}, \Omega(\gamma_{jk}^*, \gamma_{ki}^*)) -$$

$$\max(d_g(\gamma_{jk}^*, \gamma_{jk}^* + v_{jk}), d_g(\gamma_{ki}^*, \gamma_{ki}^* + v_{ki})) =$$

$$I_{AAB}(\gamma_{ij}; \gamma_{jk}^*, \gamma_{ki}^*) - \max(d_g(\gamma_{jk}^*, \gamma_{jk}^* + v_{jk}), d_g(\gamma_{ki}^*, \gamma_{ki}^* + v_{ki})) \geq$$

$$\left\|P_{\text{span}\{t_k^* - t_i^*, t_k^* - t_j^*\}^\perp}(\gamma_{ij})\right\| - \frac{\pi}{2}\sigma.$$

Denote $C_{ij}^g := \{k \in C_{ij}: ki \in E_g, jk \in E_g\}$ so that $k \in C_{ij}^g$. Note that the underlying corruption model implies that $G(V, E_g)$ is an Erdös-Rényi graph $G(n, p(1-q))$. By combining the assumption $np^2(1-q)^2 > C_0 \log n$, the set of vertices V is $C_1/\sqrt{\log n}$-well-distributed along $G(V, E_g)$ for some absolute constant $C_1$ with high probability. This fact and (153) imply that with probability $1 - n^{-5}$ $$\frac{1}{|C_{ij}^g|} \sum_{k \in C_{ij}^g} I_{AAB}(\gamma_{ij}; \gamma_{jk}, \gamma_{ki}) \geq \quad (154)$$

$$\frac{1}{|C_{ij}^g|} \sum_{k \in C_{ij}^g} \left\|P_{\text{span}\{t_k^* - t_i^*, t_k^* - t_j^*\}^\perp}(\gamma_{ij})\right\| - \frac{\pi}{2}\sigma \geq$$

$$\frac{C_1}{\sqrt{\log n}} \left\|P_{(t_i^* - t_j^*)^\perp}\gamma_{ij}\right\| - \frac{\pi}{2}\sigma =$$

$$\frac{C_1}{\sqrt{\log n}} \left\|P_{\gamma_{ij}^*\perp}\gamma_{ij}\right\| - \frac{\pi}{2}\sigma \geq \frac{C_1\pi}{2\sqrt{\log n}} \min(e_{ij}, \pi - e_{ij}) - \frac{\pi}{2}\sigma.$$

Case 2. Either $jk \in E_g$ or $ki \in E_g$, but not both in $E_g$.

Let $Y_{ij}^b(k) := I_{AAB}(\gamma_{ij}; \gamma_{jk}, \gamma_{ki})$. The arguments used for the estimates of case 2 above and the fact that $f(x) \geq 0$ imply that $\mathbb{E}[Y\gamma_{ij}^b(k)] \geq 0$.

Case 3. jk, ki $\in E_b$

This case is exactly the same as case 3 of above and thus use (151) for $z \sim U(S^2)$.

At last, combining the estimates of the 3 cases with respective probabilities $(1-q)^2$, $2q(1-q)$ and $q^2$ yields (141).

A strategy for improving the existing methods for solving synchronization problems that arises from computer vision tasks is proposed. Specifically, the strategy identifies severely corrupted relative measurements based on loop consistency information. The techniques provide the first exact recovery guarantee using loop consistency. Under certain weak conditions, the algorithm linearly converges to the desired solution.

Figure 3:
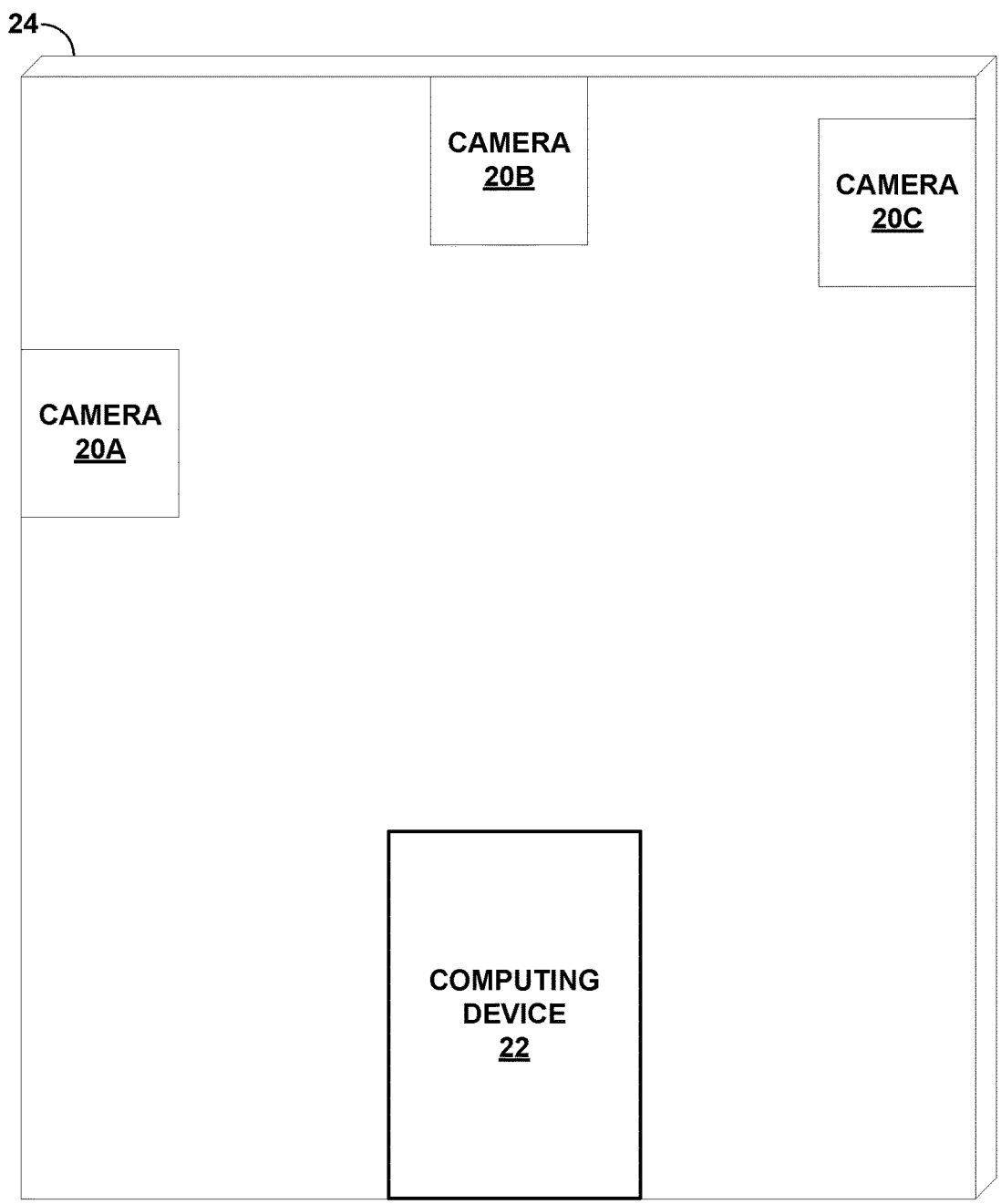
FIG. 3 is a conceptual diagram illustrating a first example implementation of the techniques described herein where the cameras are separate from the computing device reconstructing the environment, in accordance with the techniques described herein.

FIG. 3 is a conceptual diagram illustrating a first example implementation of the techniques described herein where cameras 20A-20C are separate from computing device 22 in reconstructing a digital representation of a three-dimensional environment 24, in accordance with the techniques described herein. Any number of one or more cameras, such as cameras 20A-20C shown in FIG. 3, may be included in this example implementation. In this example, cameras 20A-20C are in environment 24 and may each capture one or more images of the environment, either as still images or a sequence of video, from their respective locations and at varying orientations for each of the one or more images. Cameras 20A-20C may be fixed to some portion of or at a location in environment 24, have the ability to rotate around a fixed point in environment 24, or may have complete autonomy to move throughout environment 24. Computing device 22, which may be a robotic device with autonomous motion (or any other computing device described above with respect to computing device 12), may receive (e.g. wirelessly or by loading data from a physical drive) the images captured by cameras 20A-20C. Once these images are received, computing device 22 may proceed to digitally reconstruct a digital representation of environment 24 from the images in accordance with one or more of the techniques described herein. While FIG. 3 is shown with only three cameras, any number of cameras greater than or equal to one may be used to capture images in accordance with the techniques described herein.

Figure 4:
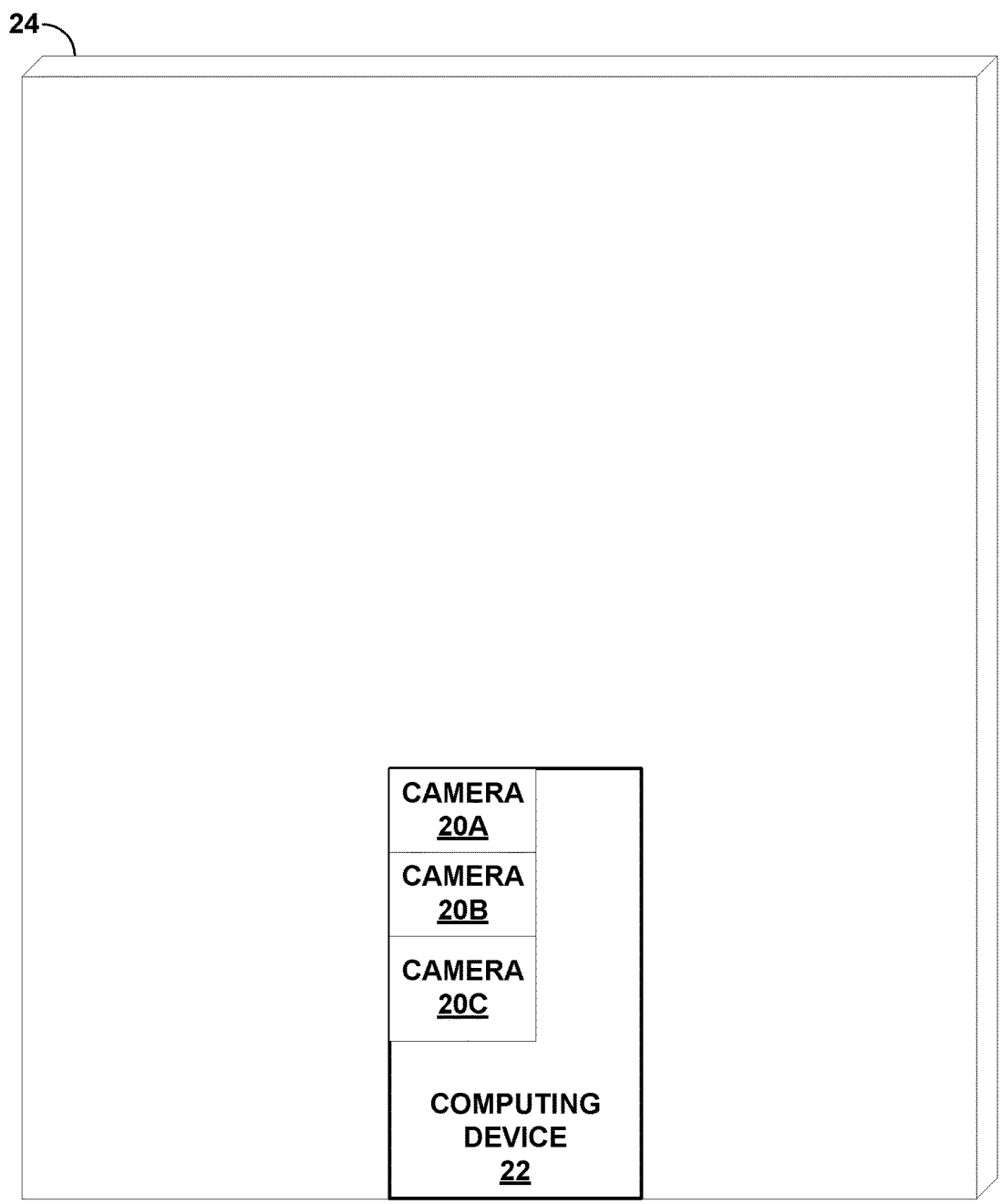
FIG. 4 is a conceptual diagram illustrating a second example implementation of the techniques described herein where multiple cameras are operatively connected to the computing device reconstructing the environment, in accordance with the techniques described herein.

FIG. 4 is a conceptual diagram illustrating a second example implementation of the techniques described herein where multiple cameras 20A-20C are operatively connected to computing device 12 that reconstructs a digital representation of three-dimensional environment 24, in accordance with the techniques described herein. Any number of one or more cameras, such as cameras 20A-20C shown in FIG. 4, may be included in this example implementation. In this example, cameras 20A-20C are physically attached to a housing of computing device 22. As they are fixed to the housing of computing device 22, cameras 20A-20C may have a fixed position relative to one another, though the absolute location and direction or orientation of the cameras may change as computing device 22 navigates through environment 24. Each of cameras 20A-20C may capture one or more images of the environment, either as still images or a sequence of video, from their respective locations and at varying orientations for each of the one or more images. Computing device 22, which may be a robotic device with autonomous motion (or any other computing device described above with respect to computing device 12), may receive the images captured by cameras 20A-20C through a wired or wireless connection to various components of computing device 22, which may or may not include wired or wireless connections directly to cameras 20A-20C. Once these images are received, computing device 22 may proceed to digitally reconstruct a digital representation of environment 24 from the images in accordance with one or more of the techniques described herein. While FIG. 4 is shown with only three cameras, any number of cameras greater than or equal to one may be used to capture images in accordance with the techniques described herein.

Figure 5:
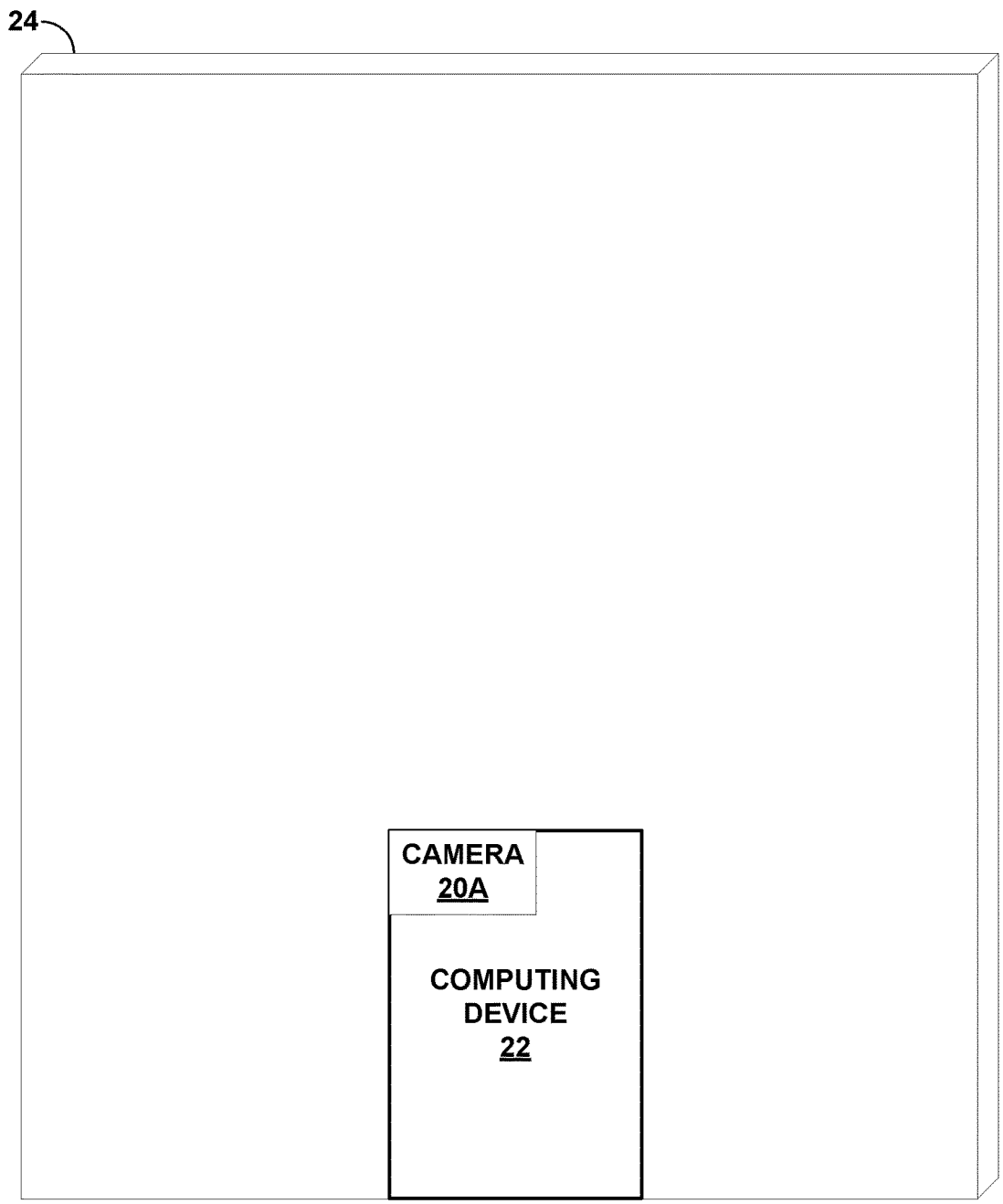
FIG. 5 is a conceptual diagram illustrating a third example implementation of the techniques described herein where a single camera is operatively connected the computing device reconstructing the environment, in accordance with the techniques described herein.

FIG. 5 is a conceptual diagram illustrating a third example implementation of the techniques described herein where a single camera 20A is operatively connected to computing device 22 that reconstructs a digital representation of three-dimensional environment 24, in accordance with the techniques described herein. In this example, camera 20A is physically attached to a housing of computing device 22. As it is fixed to the housing of computing device 22, the absolute location and direction of camera 20A may change as computing device 22 navigates through environment 24. Cameras 20A may capture one or more images, either as still images or a sequence of video, of the environment from their respective locations and at varying orientations for each of the one or more images. Computing device 22, which may be a robotic device with autonomous motion (or any other computing device described above with respect to computing device 12), may receive the images captured by camera 20A through a wired or wireless connection to various components of computing device 22, which may or may not include wired or wireless connections directly to camera 20A. Once these images are received, computing device 22 may proceed to digitally reconstruct a digital representation of environment 24 from the images in accordance with one or more of the techniques described herein.

Figure 6:
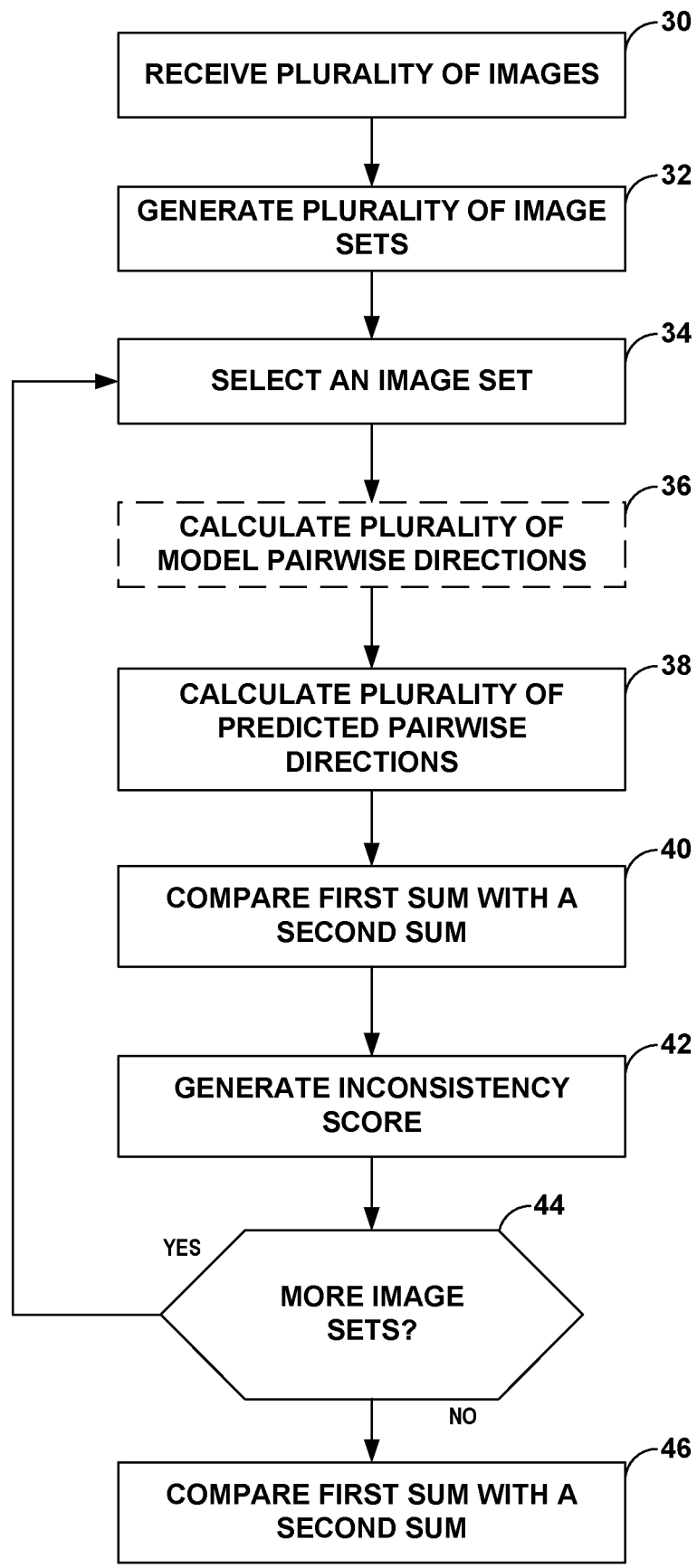
FIG. 6 is a flow diagram of one or more techniques of the current disclosure.

FIG. 6 is a flow diagram of one or more techniques of the current disclosure. The operations of computing device 12 are described within the context of computing device 12 of FIG. 1 and computing device 22 of FIGS. 2-4.

In accordance with the techniques described herein, corruption handling module 14 of computing device 12 may receive (30) a plurality of images of a three-dimensional environment from camera system 2. The plurality of images are captured by one or more cameras of camera system 2, and a respective camera of camera system 2 that captures a respective image of the plurality of images is distinctly positioned at a respective particular location and in a respective particular direction within the three-dimensional environment at a time when the respective image is captured. In some examples, each image in the plurality of images is captured by a distinct camera. In other examples, each image in the plurality of images is captured by a same camera moving through the three-dimensional environment. In still other examples, the images in each image set are captured by a set of cameras with fixed locations in relation to other cameras in the set of cameras.

Corruption handling module 14 may generate (32), from the plurality of images, a plurality of image sets. Each image set in the plurality of image sets images includes at least three images from the plurality of images.

Corruption handling module 14 may select (34) an image set from the plurality of image sets. Corruption handling module 14 may optionally calculate (36) a plurality of model pairwise directions, where each model pairwise direction is based on determined absolute locations of two different images included in the respective image set. In some instances, this means that corruption handling module 14 may calculate, based on an absolute location of a first image of the respective image set and an absolute location of a second image of the respective image set, a first model pairwise direction of the model pairwise directions. Corruption handling module 14 may also calculate, based on the absolute location of the second image of the respective image set and an absolute location of a third image of the respective image set, a second model pairwise direction of the model pairwise directions. Corruption handling module 14 may further calculate, based on the absolute location of the third image of the respective image set and the absolute location of the first image of the respective image set, a third model pairwise direction of the model pairwise directions. In such instances, the first sum is a sum of the first model pairwise direction, the second model pairwise direction, and the third model pairwise direction. However, theoretically, the sum of model pairwise directions would be equal to a zero vector. As such, rather than calculating the model pairwise directions, corruption handling module 14 may simply assume a zero vector for a sum of the model pairwise directions.

Corruption handling module 14 may calculate (38) a plurality of predicted pairwise directions, where each predicted pairwise direction is based on image details of two different images included in the respective image set. In some instances, this means corruption handling module 14 may calculate, based on image details of the first image of the respective image set and image details of the second image of the respective image set, a first predicted pairwise direction of the plurality of predicted pairwise directions. Corruption handling module 14 may also calculate, based on the image details of the second image of the respective image set and image details of the third image of the respective image set, a second predicted pairwise direction of the plurality of predicted pairwise directions. Corruption handling module 14 may further calculate, based on the image details of the third image of the respective image set and the image details of the first image of the respective image set, a third predicted pairwise direction of the plurality of predicted pairwise directions. In such instances, the second sum is a sum of the first predicted pairwise direction, the second predicted pairwise direction, and the third predicted pairwise direction.

In calculating the first, second, and third predicted pairwise directions, for each pair of images in the respective image set, corruption handling module 14 may estimate a pixel-correspondence of the respective pair of images and estimate, for each image in the respective pair of images, and based on the pixel-correspondence, a camera orientation and a relative camera location. Corruption handling module 14 may further normalize the relative camera location and the camera orientation to obtain the predicted pairwise directions.

In some examples, each model pairwise direction in model pairwise directions and each predicted pairwise direction in the plurality of predicted pairwise directions may be a respective normalized position vector. In such examples, the first sum may be a zero vector.

Corruption handling module 14 may then compare (40) a first sum of model pairwise directions with a second sum of the plurality of predicted pairwise directions and generate (42), based on the comparison of the first sum and the second sum, an inconsistency score for the respective image set. If more image sets must be analyzed ("YES" branch of 44), corruption handling module 14 may repeat acts 34-42 for the remaining image sets.

If every image set has been analyzed "(NO" branch of 44), reconstruction module 16 may then reconstruct (46), based on the plurality of image sets and on the respective inconsistency score of each image set, a digital representation of the three-dimensional environment depicted in the plurality of images. In some instances, in reconstructing the digital representation of the three-dimensional environment, for each image set of the plurality of image sets, reconstruction module 16 may compare the inconsistency score for the respective image set to an inconsistency score threshold. Responsive to determining that the inconsistency score for the respective image set is less than the inconsistency score threshold, reconstruction module 16 may include the respective image set in a group of one or more non-corrupted image sets. Conversely, responsive to determining that the inconsistency score for the respective image set is greater than the inconsistency score threshold, reconstruction module 16 may exclude, by the at least one processor, the respective image set from the group of one or more non-corrupted sets of images. For each image set included in the group of one or more non-corrupted sets of images, reconstruction module 16 may assign, based on the respective inconsistency scores, a weight to the respective image set, and reconstruct, based on the group of one or more non-corrupted image sets and the respective weights for each of the image sets in the group of one or more non-corrupted image sets, the digital representation of the three-dimensional environment.

In other instances, in reconstructing the digital representation of the three-dimensional environment. reconstruction module 16 may, for each image set of the plurality of image sets, assign, based on the respective inconsistency scores, a weight to the respective image set. Reconstruction module 16 may then reconstruct, based on the plurality of image sets and the respective weights for each of the image sets in the plurality of image sets, the digital representation of the three-dimensional environment. In such instances, after assigning a respective weight to each image set of the plurality of image sets, reconstruction module 16 may calculate a weighted average of the inconsistency scores of the plurality of image sets and iteratively reweight the respective weights for each of the image sets of the plurality of image sets to increase weights for the image sets with relatively low inconsistency scores in relation to other image sets of the plurality of image sets, and to decrease weights for the image sets with relatively high inconsistency scores in relation to the other image sets of the plurality of image sets. In examples where weights are used, the weight of each image set of the plurality of image sets is inversely proportional to the inconsistency score of the respective image set.

In some instances, in reconstructing the digital representation of the three-dimensional environment, reconstruction module 16 may reconstruct the digital representation of the three-dimensional environment utilizing one of a least unsquared deviations algorithm, a ShapeFit algorithm, or a ShapeKick algorithm.

In some examples, processors 18 may further navigate a mobile robotic device through the three-dimensional environment using the digital representation of the three-dimensional environment and one or more cameras.

Example 1

A method comprising: receiving, by at least one processor, a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generating, by the at least one processor and from the plurality of images, a plurality of image sets, wherein each image set in the plurality of image sets images includes at least three images from the plurality of images; for each image set in the plurality of image sets: calculating, by the at least one processor, a plurality of predicted pairwise directions, wherein each predicted pairwise direction is based on image details of two different images included in the respective image set; comparing, by the at least one processor, a first sum of model pairwise directions with a second sum of the plurality of predicted pairwise directions; and generating, by the at least one processor and based on the comparison of the first sum and the second sum, an inconsistency score for the respective image set; and reconstructing, by the at least one processor, based on the plurality of image sets and on the respective inconsistency score of each image set, a digital representation of the three-dimensional environment depicted in the plurality of images.

Example 2

The method of example 1, wherein reconstructing the digital representation of the three-dimensional environment comprises: for each image set of the plurality of image sets: comparing, by the at least one processor, the inconsistency score for the respective image set to an inconsistency score threshold; responsive to determining that the inconsistency score for the respective image set is less than the inconsistency score threshold, including, by the at least one processor, the respective image set in a group of one or more non-corrupted image sets; and responsive to determining that the inconsistency score for the respective image set is greater than the inconsistency score threshold, excluding, by the at least one processor, the respective image set from the group of one or more non-corrupted sets of images; for each image set included in the group of one or more non-corrupted sets of images, assigning, by the at least one processor and based on the respective inconsistency scores, a weight to the respective image set; and reconstructing, by the at least one processor and based on the group of one or more non-corrupted image sets and the respective weights for each of the image sets in the group of one or more non-corrupted image sets, the digital representation of the three-dimensional environment.

Example 3

The method of example 1, wherein reconstructing the digital representation of the three-dimensional environment comprises: for each image set of the plurality of image sets, assigning, by the at least one processor and based on the respective inconsistency scores, a weight to the respective image set; and reconstructing, by the at least one processor and based on the plurality of image sets and the respective weights for each of the image sets in the plurality of image sets, the digital representation of the three-dimensional environment.

Example 4

The method of example 3, further comprising: after assigning a respective weight to each image set of the plurality of image sets, calculating, by the at least one processor, a weighted average of the inconsistency scores of the plurality of image sets; iteratively reweighting, by the at least one processor, the respective weights for each of the image sets of the plurality of image sets to increase weights for the image sets with relatively low inconsistency scores in relation to other image sets of the plurality of image sets, and to decrease weights for the image sets with relatively high inconsistency scores in relation to the other image sets of the plurality of image sets.

Example 5

The method of any one of examples 1-4, further comprising: for each image of the plurality of images, determining, by the at least one processor, a relative rotation for the camera of the one or more cameras at a time the respective image was captured; determining, by the at least one processor, for a first image of the plurality of images, and based on the relative rotation for the first image, an absolute rotation for the camera of the one or more cameras that captured the first image and at the time the first image was captured; for each image of the plurality of images, calculating, by the at least one processor, and based on the absolute rotation for the first image, an absolute rotation for each remaining image of the plurality of images; and calculating, by the at least one processor, the model pairwise directions based on the absolute rotation for each image in the respective image set.

Example 6

The method of example 1, further comprising: calculating, by the at least one processor and based on an absolute location of a first image of the respective image set and an absolute location of a second image of the respective image set, a first model pairwise direction of the model pairwise directions; calculating, by the at least one processor and based on the absolute location of the second image of the respective image set and an absolute location of a third image of the respective image set, a second model pairwise direction of the model pairwise directions; and calculating, by the at least one processor and based on the absolute location of the third image of the respective image set and the absolute location of the first image of the respective image set, a third model pairwise direction of the model pairwise directions, wherein the first sum comprises a sum of the first model pairwise direction, the second model pairwise direction, and the third model pairwise direction.

Example 7

The method of any one of examples 1-6, wherein calculating the plurality of predicted pairwise directions comprises: calculating, by the at least one processor and based on image details of the first image of the respective image set and image details of the second image of the respective image set, a first predicted pairwise direction of the plurality of predicted pairwise directions; calculating, by the at least one processor and based on the image details of the second image of the respective image set and image details of the third image of the respective image set, a second predicted pairwise direction of the plurality of predicted pairwise directions; and calculating, by the at least one processor and based on the image details of the third image of the respective image set and the image details of the first image of the respective image set, a third predicted pairwise direction of the plurality of predicted pairwise directions, wherein the second sum comprises a sum of the first predicted pairwise direction, the second predicted pairwise direction, and the third predicted pairwise direction.

Example 8

The method of any one of examples 1-7, wherein calculating each predicted pairwise direction of the plurality of predicted pairwise directions comprises, for each pair of images in the respective image set: estimating, by the at least one processor, a pixel-correspondence of the respective pair of images; estimating, by the at least one processor, for each image in the respective pair of images, and based on the pixel-correspondence, a camera orientation and a relative camera location; and normalizing, by the at least one processor, the relative camera location and the camera orientation to obtain the predicted pairwise directions.

Example 9

The method of any one of examples 1-8, wherein each image in the plurality of images is captured by either a distinct camera or a same camera moving through the three-dimensional environment.

Example 10

The method of any one of examples 1-9, wherein the images in each image set are captured by a set of cameras with fixed locations in relation to other cameras in the set of cameras.

Example 11

The method of any one of examples 1-10, wherein each model pairwise direction in the model pairwise directions and each predicted pairwise direction in the plurality of predicted pairwise directions comprise a respective normalized position vector, and wherein the first sum comprises a zero vector.

Example 12

The method of any one of examples 1-11, further comprising:
  navigating, by the at least one processor, a mobile robotic device through the three-dimensional environment using the digital representation of the three-dimensional environment and one or more cameras.

Example 13

The method of any one of examples 1-12, wherein reconstructing the digital representation of the three-dimensional environment comprises reconstructing the digital representation of the three-dimensional environment utilizing one of a least unsquared deviations algorithm, a ShapeFit algorithm, or a ShapeKick algorithm.

Example 14

A device comprising: at least one processor; and a storage device configured to store one or more modules operable by the at least one processor to: receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generate, from the plurality of images, a plurality of image sets, wherein each image set in the plurality of image sets images includes at least three images from the plurality of images; for each image set in the plurality of image sets: calculate a plurality of predicted pairwise directions, wherein each predicted pairwise direction is based on image details of two different images included in the respective image set; compare a first sum of model pairwise directions with a second sum of the plurality of predicted pairwise directions; and generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

Example 15

The device of example 14, wherein the one or more modules operable by the at least one processor to reconstruct the digital representation of the three-dimensional environment are further operable by the at least one processor to: for each image set of the plurality of image sets: compare the inconsistency score for the respective image set to an inconsistency score threshold; responsive to determining that the inconsistency score for the respective image set is less than the inconsistency score threshold, include the respective image set in a group of one or more non-corrupted image sets; and responsive to determining that the inconsistency score for the respective image set is greater than the inconsistency score threshold, exclude the respective image set from the group of one or more non-corrupted sets of images; for each image set included in the group of one or more non-corrupted sets of images, assign, based on the respective inconsistency scores, a weight to the respective image set; and reconstruct, based on the group of one or more non-corrupted image sets and the respective weights for each of the image sets in the group of one or more non-corrupted image sets, the digital representation of the three-dimensional environment.

Example 16

The device of any one of examples 14-15, wherein the one or more modules operable by the at least one processor to reconstruct the digital representation of the three-dimensional environment are further operable by the at least one processor to: for each image set of the plurality of image sets, assign, based on the respective inconsistency scores, a weight to the respective image set, wherein the respective weight of each image set of the plurality of image sets is inversely proportional to the inconsistency score of the respective image set; calculate a weighted average of the inconsistency scores of the plurality of image sets; iteratively reweight the respective weights for each of the image sets of the plurality of image sets to increase weights for the image sets with relatively low inconsistency scores in relation to other image sets of the plurality of image sets, and to decrease weights for the image sets with relatively high inconsistency scores in relation to the other image sets of the plurality of image sets; and reconstruct, based on the plurality of image sets and the respective weights for each of the image sets in the plurality of image sets, the digital representation of the three-dimensional environment.

Example 17

The device of any one of examples 14-16, wherein the one or more modules are further operable by the at least one processor to: calculate, based on an absolute location a first image of the respective image set and an absolute location of a second image of the respective image set, a first model pairwise direction of the model pairwise directions; calculate, based on the absolute location of the second image of the respective image set and an absolute location of a third image of the respective image set, a second model pairwise direction of the model pairwise directions; and calculate, based on the absolute location of the third image of the respective image set and the absolute location of the first image of the respective image set, a third model pairwise direction of the model pairwise directions, wherein the first sum comprises a sum of the first model pairwise direction, the second model pairwise direction, and the third model pairwise direction.

Example 18

The device of any one of examples 14-17, wherein the one or more modules operable by the at least one processor to calculate the plurality of predicted pairwise directions are further operable by the at least one processor to: calculate, based on image details of the first image of the respective image set and image details of the second image of the respective image set, a first predicted pairwise direction of the plurality of predicted pairwise directions; calculate, based on the image details of the second image of the respective image set and image details of the third image of the respective image set, a second predicted pairwise direction of the plurality of predicted pairwise directions; and calculate, based on the image details of the third image of the respective image set and the image details of the first image of the respective image set, a third predicted pairwise direction of the plurality of predicted pairwise directions, wherein the second sum comprises a sum of the first predicted pairwise direction, the second predicted pairwise direction, and the third predicted pairwise direction.

Example 19

The device of any one of examples 14-18, wherein the one or more modules operable by the at least one processor to calculate each predicted pairwise direction of the plurality of predicted pairwise directions are further operable by the at least one processor to, for each pair of images in the respective image set: estimate a pixel-correspondence of the respective pair of images; estimate, for each image in the respective pair of images, and based on the pixel-correspondence, a camera orientation and a relative camera location; and normalize the relative camera location and the camera orientation to obtain the predicted pairwise directions.

Example 20

A non-transitory computer-readable storage medium storing instructions that, when executed, cause one or more processors of a field computing device to: receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured; generate, from the plurality of images, a plurality of image sets, wherein each image set in the plurality of image sets images includes at least three images from the plurality of images; for each image set in the plurality of image sets: calculate a plurality of predicted pairwise directions, wherein each predicted pairwise direction is based on image details of two different images included in the respective image set; compare a first sum of model pairwise directions with a second sum of the plurality of predicted pairwise directions; generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

Example 21

A device comprising one or more processors configured to perform the methods of any one of examples 1-13 or combination thereof.

Example 22

A computer readable storage medium storing instructions that, when executed by one or more processors, cause the one or more processors to perform the methods of any one of examples 1-13 or combination thereof.

Example 23

A device comprising means for performing the methods of any one of examples 1-13 or combination thereof.

Example 24

Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
    receiving, by at least one processor, a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured;
    generating, by the at least one processor and from the plurality of images, a plurality of image sets, wherein each image set in the plurality of image sets images includes at least three images from the plurality of images;
    for each image set in the plurality of image sets:
        calculating, by the at least one processor, a plurality of predicted pairwise directions, wherein each predicted pairwise direction is based on image details of two different images included in the respective image set;
        comparing, by the at least one processor, a first sum of model pairwise directions with a second sum of the plurality of predicted pairwise directions; and
        generating, by the at least one processor and based on the comparison of the first sum and the second sum, an inconsistency score for the respective image set; and
    reconstructing, by the at least one processor, based on the plurality of image sets and on the respective inconsistency score of each image set, a digital representation of the three-dimensional environment depicted in the plurality of images.

2. The method of claim 1, wherein reconstructing the digital representation of the three-dimensional environment comprises:
    for each image set of the plurality of image sets:
        comparing, by the at least one processor, the inconsistency score for the respective image set to an inconsistency score threshold;
        responsive to determining that the inconsistency score for the respective image set is less than the inconsistency score threshold, including, by the at least one processor, the respective image set in a group of one or more non-corrupted image sets; and
        responsive to determining that the inconsistency score for the respective image set is greater than the inconsistency score threshold, excluding, by the at least one processor, the respective image set from the group of one or more non-corrupted image sets;
    for each image set included in the group of one or more non-corrupted image sets, assigning, by the at least one processor and based on the respective inconsistency score, a weight to the respective image set; and
    reconstructing, by the at least one processor and based on the group of one or more non-corrupted image sets and the respective weight for each of the image sets in the group of one or more non-corrupted image sets, the digital representation of the three-dimensional environment.

3. The method of claim 1, wherein reconstructing the digital representation of the three-dimensional environment comprises:
    for each image set of the plurality of image sets, assigning, by the at least one processor and based on the respective inconsistency score, a weight to the respective image set; and
    reconstructing, by the at least one processor and based on the plurality of image sets and the respective weight for each of the image sets in the plurality of image sets, the digital representation of the three-dimensional environment.

4. The method of claim 3, wherein the respective weight of each image set of the plurality of image sets is inversely proportional to the inconsistency score of the respective image set, and wherein the method further comprises, after assigning the weight to each respective image set of the plurality of image sets:
    calculating, by the at least one processor, a weighted average of the inconsistency scores of the plurality of image sets; and
    iteratively reweighting, by the at least one processor, the respective weight for each of the image sets of the plurality of image sets to increase weights for the image sets with relatively low inconsistency scores in relation to other image sets of the plurality of image sets, and to decrease weights for the image sets with relatively high inconsistency scores in relation to the other image sets of the plurality of image sets.

5. The method of claim 1, further comprising:
    for each image of the plurality of images, determining, by the at least one processor, a relative rotation for the camera of the one or more cameras at a time the respective image was captured;
    determining, by the at least one processor, for a first image of the plurality of images, and based on the relative rotation for the first image, an absolute rotation for the camera of the one or more cameras that captured the first image and at the time the first image was captured;

for each image of the plurality of images, calculating, by the at least one processor, and based on the absolute rotation for the first image, an absolute rotation for each remaining image of the plurality of images; and calculating, by the at least one processor, the model pairwise directions based on the absolute rotation for each image in the respective image set.

6. The method of claim 1, further comprising:

calculating, by the at least one processor and based on an absolute location of a first image of the respective image set and an absolute location of a second image of the respective image set, a first model pairwise direction of the model pairwise directions;

calculating, by the at least one processor and based on the absolute location of the second image of the respective image set and an absolute location of a third image of the respective image set, a second model pairwise direction of the model pairwise directions; and calculating, by the at least one processor and based on the absolute location of the third image of the respective image set and the absolute location of the first image of the respective image set, a third model pairwise direction of the model pairwise directions, wherein the first sum comprises a sum of the first model pairwise direction, the second model pairwise direction, and the third model pairwise direction.

7. The method of claim 1, wherein calculating the plurality of predicted pairwise directions comprises:

calculating, by the at least one processor and based on image details of the first image of the respective image set and image details of the second image of the respective image set, a first predicted pairwise direction of the plurality of predicted pairwise directions;

calculating, by the at least one processor and based on the image details of the second image of the respective image set and image details of the third image of the respective image set, a second predicted pairwise direction of the plurality of predicted pairwise directions; and calculating, by the at least one processor and based on the image details of the third image of the respective image set and the image details of the first image of the respective image set, a third predicted pairwise direction of the plurality of predicted pairwise directions, wherein the second sum comprises a sum of the first predicted pairwise direction, the second predicted pairwise direction, and the third predicted pairwise direction.

8. The method of claim 1, wherein calculating each predicted pairwise direction of the plurality of predicted pairwise directions comprises, for each pair of images in the respective image set:

estimating, by the at least one processor, a pixel-correspondence of the respective pair of images;

estimating, by the at least one processor, for each image in the respective pair of images, and based on the pixel-correspondence, a camera orientation and a relative camera location; and normalizing, by the at least one processor, the relative camera location and the camera orientation for the pair of images to obtain the respective predicted pairwise direction.

9. The method of claim 1, wherein each image in the plurality of images is captured by either a distinct camera or a same camera moving through the three-dimensional environment.

10. The method of claim 1, wherein the images in each image set are captured by a set of cameras with fixed locations in relation to other cameras in the set of cameras.

11. The method of claim 1, wherein each model pairwise direction in the model pairwise directions and each predicted pairwise direction in the plurality of predicted pairwise directions comprise a respective normalized position vector, and wherein the first sum comprises a zero vector.

12. The method of claim 1, further comprising:

navigating, by the at least one processor, a mobile robotic device through the three-dimensional environment using the digital representation of the three-dimensional environment and the one or more cameras.

13. The method of claim 1, wherein reconstructing the digital representation of the three-dimensional environment comprises reconstructing the digital representation of the three-dimensional environment utilizing one of a least unsquared deviations algorithm, a ShapeFit algorithm, or a ShapeKick algorithm.

14. A device comprising:

at least one processor; and a storage device configured to store one or more modules operable by the at least one processor to:

receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured;

generate, from the plurality of images, a plurality of image sets, wherein each image set in the plurality of image sets images includes at least three images from the plurality of images;

for each image set in the plurality of image sets:

calculate a plurality of predicted pairwise directions, wherein each predicted pairwise direction is based on image details of two different images included in the respective image set;

compare a first sum of model pairwise directions with a second sum of the plurality of predicted pairwise directions; and generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

15. The device of claim 14, wherein the one or more modules operable by the at least one processor to reconstruct the digital representation of the three-dimensional environment are further operable by the at least one processor to:

for each image set of the plurality of image sets:

compare the inconsistency score for the respective image set to an inconsistency score threshold;

responsive to determining that the inconsistency score for the respective image set is less than the inconsistency score threshold, include the respective image set in a group of one or more non-corrupted image sets; and responsive to determining that the inconsistency score for the respective image set is greater than the inconsistency score threshold, exclude the respective image set from the group of one or more non-corrupted sets of images;

for each image set included in the group of one or more non-corrupted sets of images, assign, based on the respective inconsistency scores, a weight to the respective image set; and reconstruct, based on the group of one or more non-corrupted image sets and the respective weights for each of the image sets in the group of one or more non-corrupted image sets, the digital representation of the three-dimensional environment.

16. The device of claim 14, wherein the one or more modules operable by the at least one processor to reconstruct the digital representation of the three-dimensional environment are further operable by the at least one processor to:

for each image set of the plurality of image sets, assign, based on the respective inconsistency scores, a weight to the respective image set, wherein the respective weight of each image set of the plurality of image sets is inversely proportional to the inconsistency score of the respective image set;

calculate a weighted average of the inconsistency scores of the plurality of image sets;

iteratively reweight the respective weights for each of the image sets of the plurality of image sets to increase weights for the image sets with relatively low inconsistency scores in relation to other image sets of the plurality of image sets, and to decrease weights for the image sets with relatively high inconsistency scores in relation to the other image sets of the plurality of image sets; and reconstruct, based on the plurality of image sets and the respective weights for each of the image sets in the plurality of image sets, the digital representation of the three-dimensional environment.

17. The device of claim 14, wherein the one or more modules are further operable by the at least one processor to:

calculate, based on an absolute location a first image of the respective image set and an absolute location of a second image of the respective image set, a first model pairwise direction of the model pairwise directions;

calculate, based on the absolute location of the second image of the respective image set and an absolute location of a third image of the respective image set, a second model pairwise direction of the model pairwise directions; and calculate, based on the absolute location of the third image of the respective image set and the absolute location of the first image of the respective image set, a third model pairwise direction of the model pairwise directions, wherein the first sum comprises a sum of the first model pairwise direction, the second model pairwise direction, and the third model pairwise direction.

18. The device of claim 14, wherein the one or more modules operable by the at least one processor to calculate the plurality of predicted pairwise directions are further operable by the at least one processor to:

calculate, based on image details of the first image of the respective image set and image details of the second image of the respective image set, a first predicted pairwise direction of the plurality of predicted pairwise directions;

calculate, based on the image details of the second image of the respective image set and image details of the third image of the respective image set, a second predicted pairwise direction of the plurality of predicted pairwise directions; and calculate, based on the image details of the third image of the respective image set and the image details of the first image of the respective image set, a third predicted pairwise direction of the plurality of predicted pairwise directions, wherein the second sum comprises a sum of the first predicted pairwise direction, the second predicted pairwise direction, and the third predicted pairwise direction.

19. The device of claim 14, wherein the one or more modules operable by the at least one processor to calculate each predicted pairwise direction of the plurality of predicted pairwise directions are further operable by the at least one processor to, for each pair of images in the respective image set:

estimate a pixel-correspondence of the respective pair of images;

estimate, for each image in the respective pair of images, and based on the pixel-correspondence, a camera orientation and a relative camera location; and normalize the relative camera location and the camera orientation for the pair of images to obtain the respective predicted pairwise direction.

20. A non-transitory computer-readable storage medium storing instructions that, when executed, cause one or more processors of a field computing device to:

receive a plurality of images of a three-dimensional environment, wherein the plurality of images are captured by one or more cameras, and wherein a respective camera of the one or more cameras that captures a respective image of the plurality of images is distinctly positioned at a respective particular location and in a respective particular direction within the three-dimensional environment at a time when the respective image is captured;

generate, from the plurality of images, a plurality of image sets, wherein each image set in the plurality of image sets images includes at least three images from the plurality of images;

for each image set in the plurality of image sets:
calculate a plurality of predicted pairwise directions, wherein each predicted pairwise direction is based on image details of two different images included in the respective image set;

compare a first sum of model pairwise directions with a second sum of the plurality of predicted pairwise directions;

generate, based on the comparison of the first sum and the second sum, an inconsistency score for the respective image set; and reconstruct, based on the plurality of image sets and on the respective inconsistency score of each image set, a digital representation of the three-dimensional environment depicted in the plurality of images.

* * * * *